United States Patent
Yoo et al.

(10) Patent No.: US 7,072,017 B1
(45) Date of Patent: Jul. 4, 2006

(54) MULTI-DOMAIN LIQUID CRYSTAL DISPLAY DEVICE HAVING A COMMON-AUXILIARY ELECTRODE AND DIELECTRIC STRUCTURES

(75) Inventors: Jang Jin Yoo, Seoul (KR); Doo Hyun Ko, Kumi-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 215 days.

(21) Appl. No.: 09/606,407

(22) Filed: Jun. 29, 2000

(51) Int. Cl.
  *G02F 1/1337* (2006.01)

(52) U.S. Cl. .................. 349/129; 349/139; 349/191
(58) Field of Classification Search .............. 349/38, 349/39, 129, 139, 191
See application file for complete search history.

(56) References Cited

U.S. PATENT DOCUMENTS

| | | | |
|---|---|---|---|
| 4,581,608 A | 4/1986 | Aftergut et al. | 340/704 |
| 4,728,175 A | 3/1988 | Baron | 350/336 |
| 4,937,566 A | 6/1990 | Clerc | 340/784 |

(Continued)

FOREIGN PATENT DOCUMENTS

| | | |
|---|---|---|
| EP | 0 752 611 | 1/1997 |
| EP | 0 814 142 | 12/1997 |
| EP | 0 854 377 | 7/1998 |
| EP | 0 884 626 | 12/1998 |
| GB | 2 296 810 | 7/1996 |
| GB | 2 321 718 | 8/1998 |
| GB | 2 337 843 | 1/1999 |
| JP | 05-297412 | 11/1993 |
| JP | 09-197420 | 7/1997 |
| JP | 09-230387 | 9/1997 |
| WO | 961 0774 | 4/1996 |

OTHER PUBLICATIONS

A. Lien, R.A. John, Two–Domain TN–LCDs Fabricated by Parallel Fringe Field Method, SID Digest, 1993, pp. 269–272.
A. Lien, R.A. John, TFT–Addressed Two–Domain TN VGA Displays Fabricated Using the Parallel Fringe Field Method, SID Digest, 1994, pp. 594–597.
N. Koma, Y. Baba, K. Matsuoka, No–Rub Multi–Domain TFT–LCD Using Surrounding–Electrode Method, SID Digest, 1995, pp. 869–872.
H. Murai, M. Suzuki, S. Kaneko, Novel High Contrast Random and Controlled 4–Domain CTN–LCDs with Wide Viewing Angle, Euro Display '96, pp. 159–161.

(Continued)

*Primary Examiner*—Andrew Schechter
(74) *Attorney, Agent, or Firm*—McKenna Long & Aldridge LLP

(57) ABSTRACT

A multi-domain liquid crystal display device includes: first and second substrates opposing each other; a plurality of gate lines and data lines on the first substrate lengthwise and crosswise, to define a pixel region; a common auxiliary electrode on a layer equal to the gate lines to surround the pixel region; a gate insulating film on the first substrate; a passivation film on the gate insulating film including the first substrate; a pixel electrode in the pixel region; a light-shielding layer on the second substrate; a color filter layer on the light-shielding layer; a common electrode on the color filter layer; a plurality of electric field distortion dielectric structures patterned in different forms within neighboring pixels; an alignment film on at least one of the first and second substrates; and a liquid crystal layer between the first substrate and the second substrate.

36 Claims, 41 Drawing Sheets

U.S. PATENT DOCUMENTS

| | | | |
|---|---|---|---|
| 4,978,203 A | | 12/1990 | Yamazaki et al. ...... 350/339 R |
| 5,249,070 A | | 9/1993 | Takano ........................ 359/54 |
| 5,459,596 A | * | 10/1995 | Ueda et al. ................... 359/59 |
| 5,574,582 A | | 11/1996 | Takeda et al. ................ 359/59 |
| 5,608,556 A | * | 3/1997 | Koma ......................... 349/143 |
| 5,623,354 A | | 4/1997 | Lien et al. .................. 349/124 |
| 5,668,650 A | | 9/1997 | Mori et al. ................... 349/42 |
| 5,694,185 A | * | 12/1997 | Oh ............................... 349/46 |
| 5,737,051 A | | 4/1998 | Kondo et al. ............... 349/141 |
| 5,777,701 A | | 7/1998 | Zhang ......................... 349/44 |
| 5,907,380 A | * | 5/1999 | Lien ........................... 349/141 |
| 5,956,109 A | * | 9/1999 | Jung ........................... 349/110 |
| 6,097,464 A | * | 8/2000 | Liu ............................. 349/130 |
| 6,157,426 A | * | 12/2000 | Gu .............................. 349/111 |
| 6,285,431 B1 | * | 9/2001 | Lyu et al. ................... 349/143 |
| 6,462,798 B1 | * | 10/2002 | Kim ............................ 349/129 |

OTHER PUBLICATIONS

Y. Koike, S. Kataoka, T. Sasaki, H. Chida, H. Tsuda, A. Takeda and K. Ohmuro, T. Sasabayashi, K. Okamoto, A Vertically Aligned LCD Providing Super–High Image Quality, IDW '97, pp. 159–162.

N. Koma, R. Nishikawa, Development of a High–Quality TFT–LCD for Projection Displays, SID Digest, 1997, pp. 461–464.

K. Ohmuro, S. Kataoka, T. Sasaki, Y. Koike, Development of Super–High Image Quality Vertical Alignment Mode LCD, SID Digest, 1997, pp. 845–848.

* cited by examiner

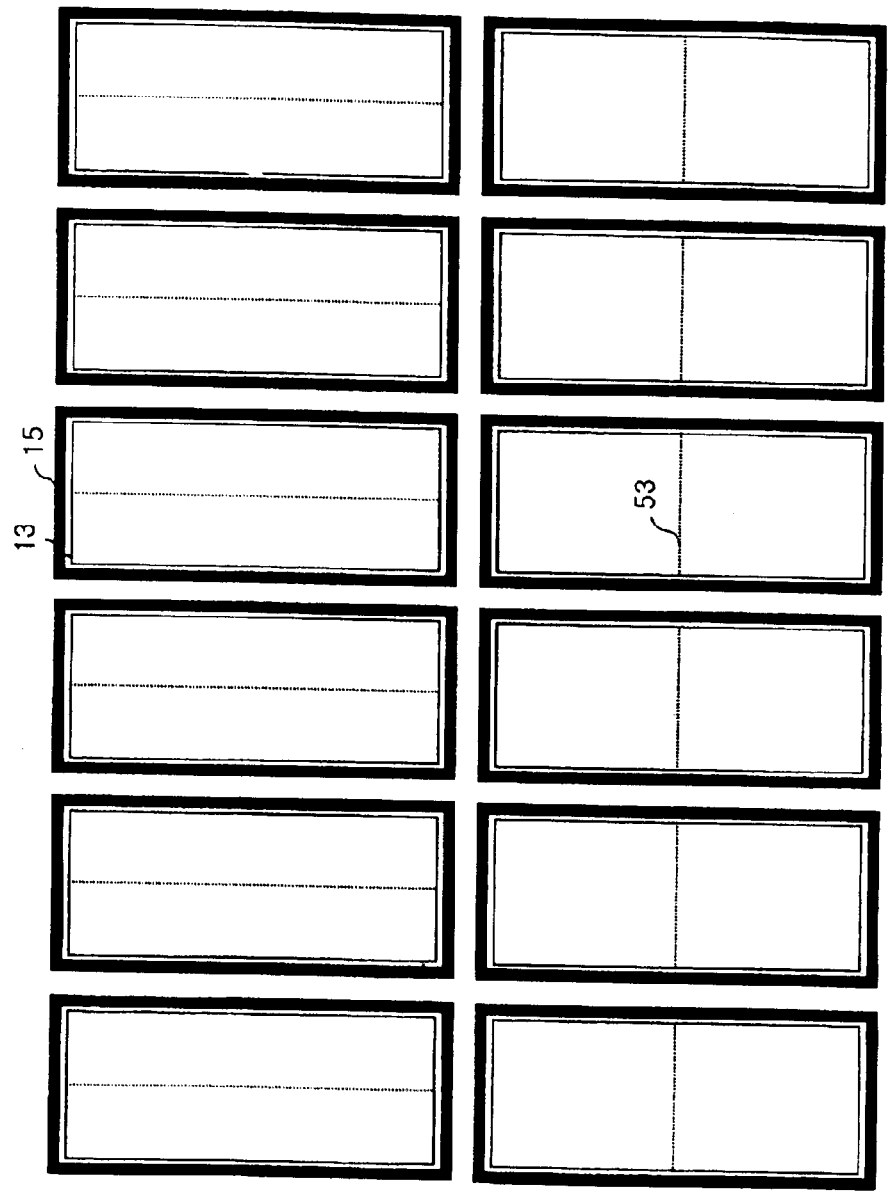

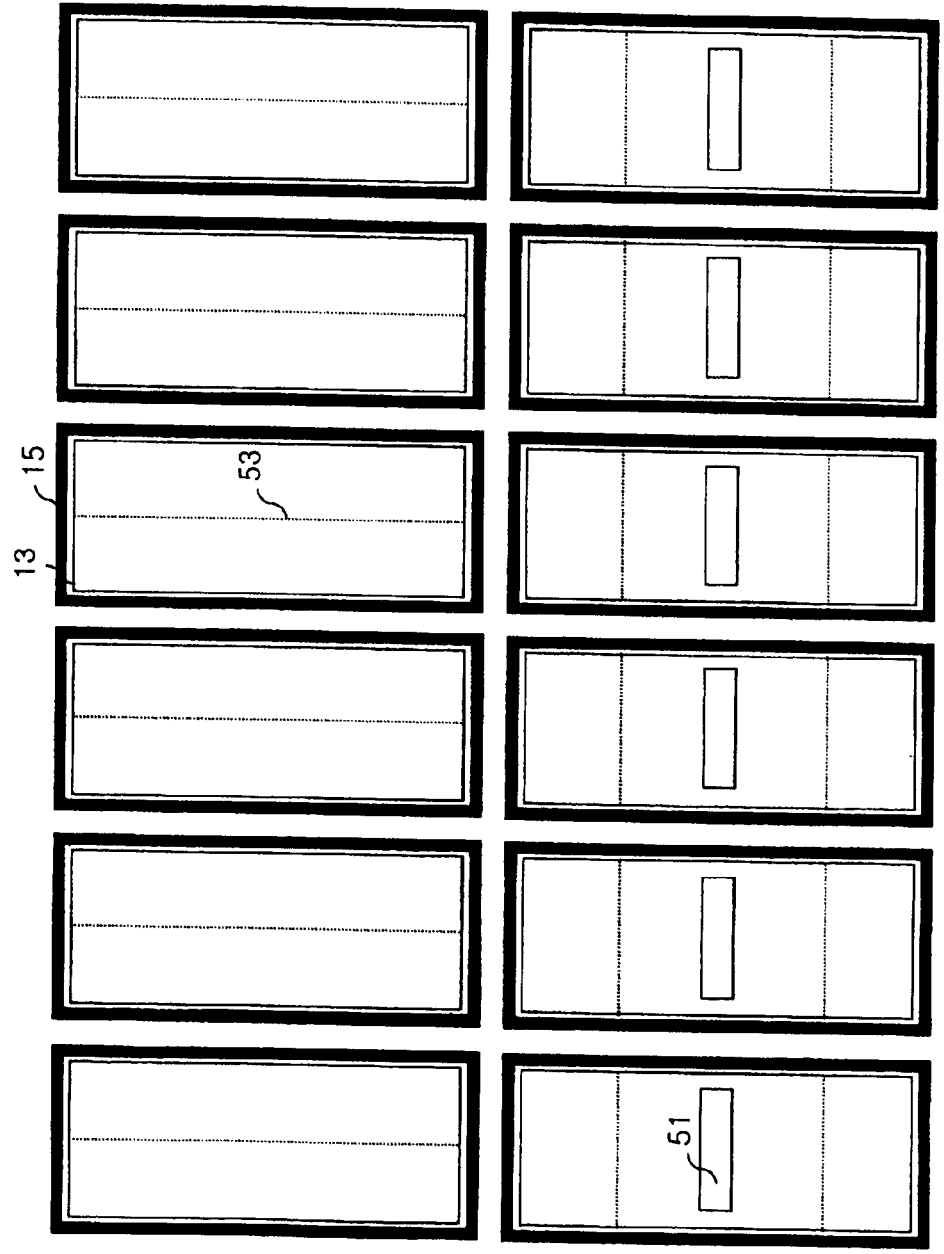

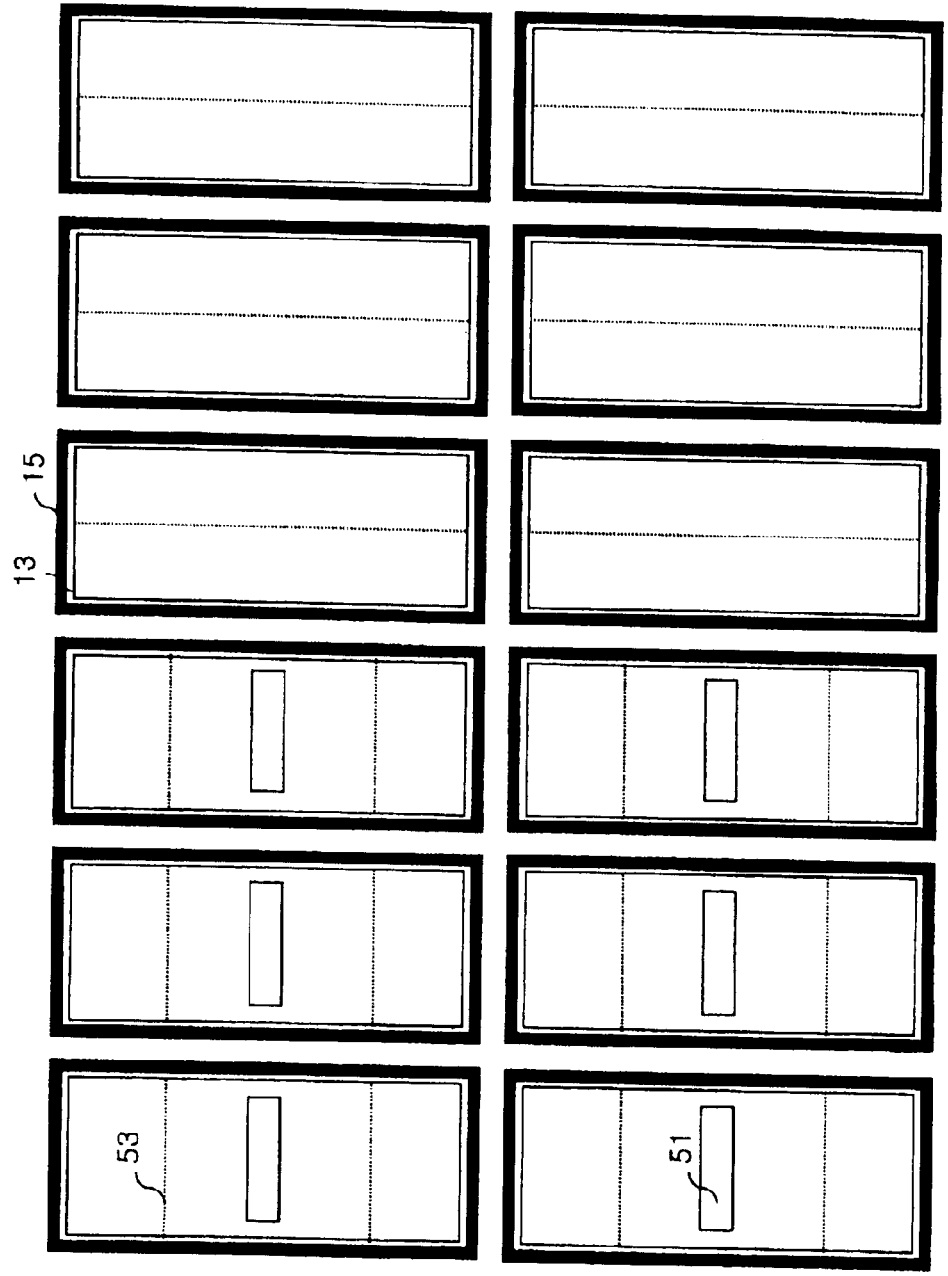

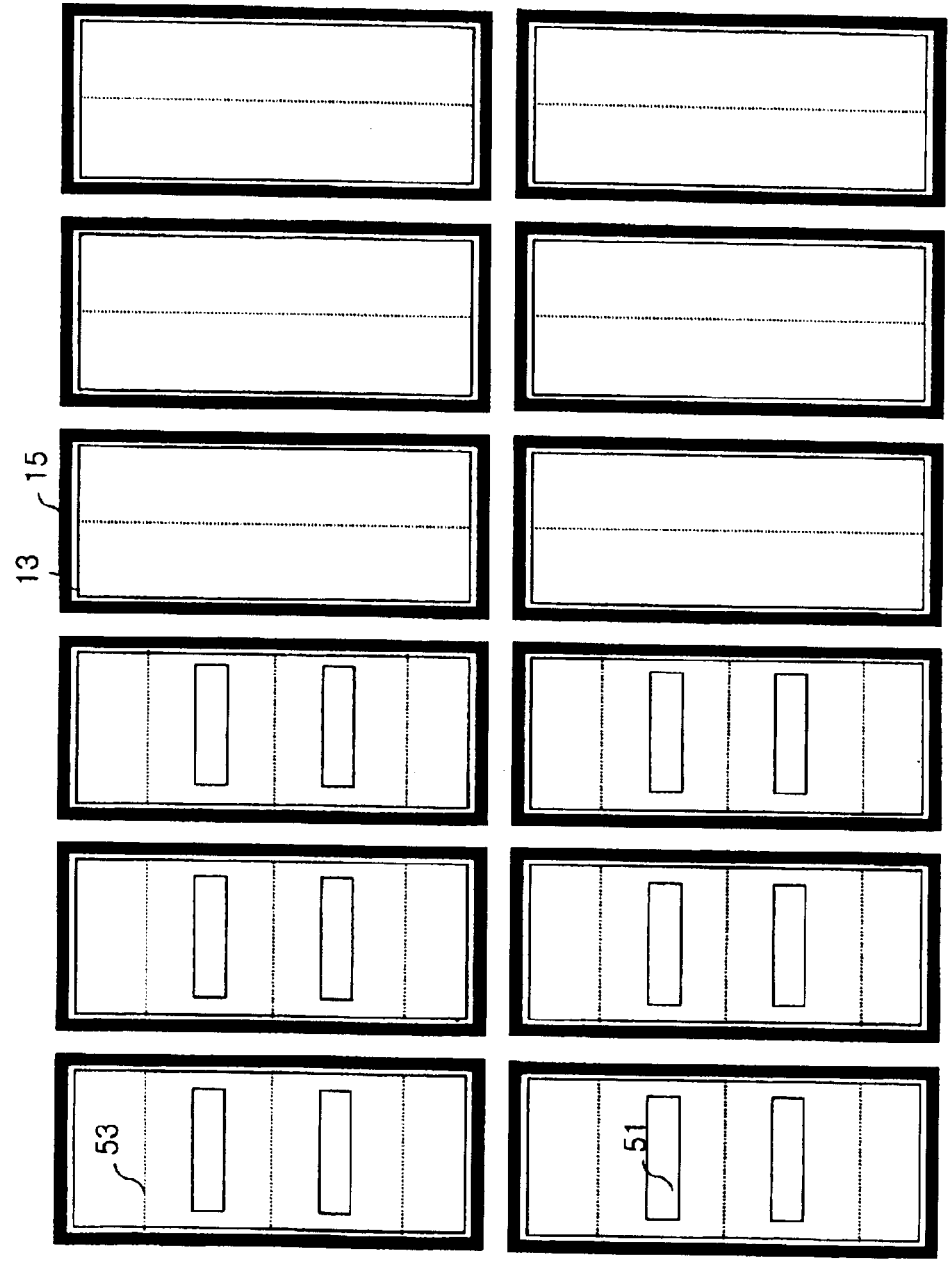

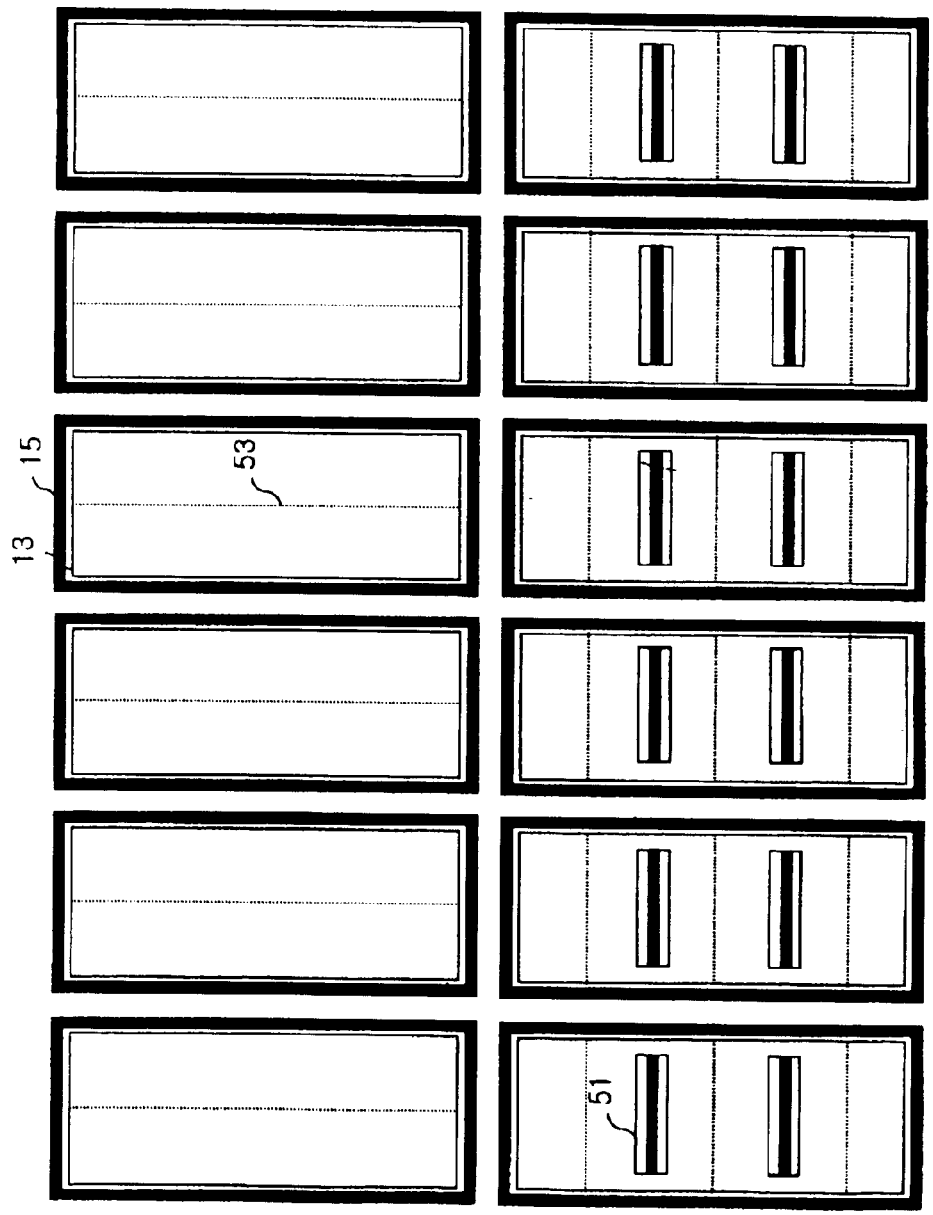

MULTI-DOMAIN LIQUID CRYSTAL DISPLAY DEVICE HAVING A COMMON-AUXILIARY ELECTRODE AND DIELECTRIC STRUCTURES

BACKGROUND OF THE INVENTION

1. Field of the Invention

The present invention relates to a liquid crystal display device, and more particularly, to a multi-domain liquid crystal display device in which a common auxiliary electrode is formed on a layer equal to a gate line to surround a pixel region and a dielectric structure is formed on a common electrode so that a viewing angle extends.

2. Discussion of the Related Art

Recently, a liquid crystal display device which drives a liquid crystal by an auxiliary electrode electrically insulated from a pixel electrode without aligning the liquid crystal has been suggested. Such a related art liquid crystal display device will be described with reference to FIGS. 1a and 1b.

As shown in FIG. 1a, the related art liquid crystal display device includes a first substrate, a second substrate 33, a plurality of data lines and gate lines, a thin film transistor, a pixel electrode 13, a passivation film 37, and an auxiliary electrode 21. The data lines and gate lines are formed on the first substrate lengthwise and crosswise to divide the first substrate into a plurality of pixel regions. The thin film transistor is formed in each pixel region on the first substrate and includes a gate electrode, a gate insulating film, a semiconductor layer, an ohmic contact layer, and a source/drain electrode. The pixel electrode 13 is formed on the gate insulating film and the passivation film 37 is formed on the pixel electrode 13 including the whole first substrate. The auxiliary electrode 21 is formed on the passivation film 37 to partially overlap the pixel electrode 13. At this time, the pixel electrode may be etched in a specific form to form an open region so that the pixel region is divided.

The related art liquid crystal display device further includes a light-shielding layer, a color filter layer formed on the light-shielding layer, a common electrode 17 formed on the color filter layer, and a liquid crystal layer formed between the first substrate and the second substrate. The light-shielding layer is formed on the second substrate 33 to shield light leaked from the gate line, the data line, and the thin film transistor. An open region 27 may be formed in the common electrode 17 to distort electric field applied to the liquid crystal layer.

The auxiliary electrode 21 formed around the pixel electrode 13 and the open region 27 of the common electrode 17 distort electric field applied to the liquid crystal layer so that liquid crystal molecules are variously driven within a unit pixel. This is intended that a dielectric energy by the distorted electric field places a liquid crystal director at a desired position.

However, the liquid crystal display device requires the open region 27 in the pixel electrode 13 or the common electrode 17 to obtain multi-domain effect. To this end, the process for patterning the electrodes is additionally required.

Furthermore, if the open region 27 is not formed or has a small width, distortion range of the electric field required to divide the domain is weak. Accordingly, there is a problem that the time when the liquid crystal director reaches a stable state relatively becomes longer.

SUMMARY OF THE INVENTION

Accordingly, the present invention is directed to a multi-domain liquid crystal display device that substantially obviates one or more of the problems due to limitations and disadvantages of the related art.

An object of the present invention is to provide a multi-domain liquid crystal display device in which a common auxiliary electrode is formed on a layer equal to a gate line to surround a pixel region and a plurality of dielectric structures are patterned in different forms within neighboring pixels on the common electrode.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, a multi-domain liquid crystal display device according to the present invention includes: first and second substrates opposing each other; a plurality of gate lines and data lines formed on the first substrate lengthwise and crosswise, for defining a pixel region; a common auxiliary electrode formed on a layer equal to the gate lines to surround the pixel region; a gate insulating film formed on the first substrate; a passivation film formed on the gate insulating film including the first substrate; a pixel electrode formed in the pixel region; a light-shielding layer formed on the second substrate; a color filter layer formed on the light-shielding layer; a common electrode formed on the color filter layer; a plurality of electric field distortion dielectric structures patterned in different forms within neighboring pixels; an alignment film formed at least one of the first and second substrates; and a liquid crystal layer formed between the first substrate and the second substrate.

The multi-domain liquid crystal display device of the present invention is characterized in that an electric field dielectric structure is additionally formed on the pixel electrode or an electric field induction window is formed within the dielectric structure. The dielectric structure has a constant smaller than that of the liquid crystal layer and is made of photosensitive material, and preferably, photoacrylate or benzocyclobutene(BCB). The liquid crystal has a positive dielectric anisotropy or a negative dielectric anisotropy, and the liquid crystal layer may include a chiral dopant.

It is to be understood that both the foregoing general description and the following detailed description are exemplary and explanatory and are intended to provide further explanation of the invention as claimed.

BRIEF DESCRIPTION OF THE DRAWINGS

The invention will be described in detail with reference to the following drawings in which like reference numerals refer to like elements wherein:

FIGS. 7a to 7e are plan views showing a multi-domain liquid crystal display device according to the sixth embodiment of the present invention;

FIGS. 8a to 8e are plan views showing a multi-domain liquid crystal display device according to the seventh embodiment of the present invention;

FIGS. 9a to 9e are plan views showing a multi-domain liquid crystal display device according to the eighth embodiment of the present invention;

FIGS. 11a to 11e are plan views showing a multi-domain liquid crystal display device according to the tenth embodiment of the present invention;

DETAILED DESCRIPTION OF THE PREFERRED EMBODIMENTS

Figure 1A:
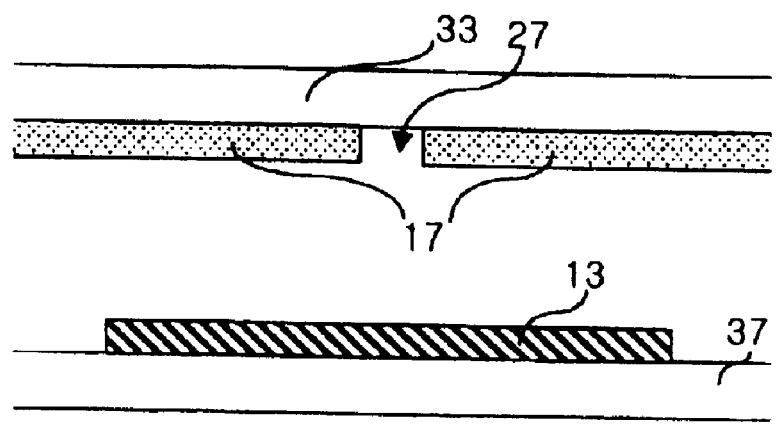
FIGS. 1a and 1b are sectional views showing a related art liquid crystal display device.
Figure 1B:
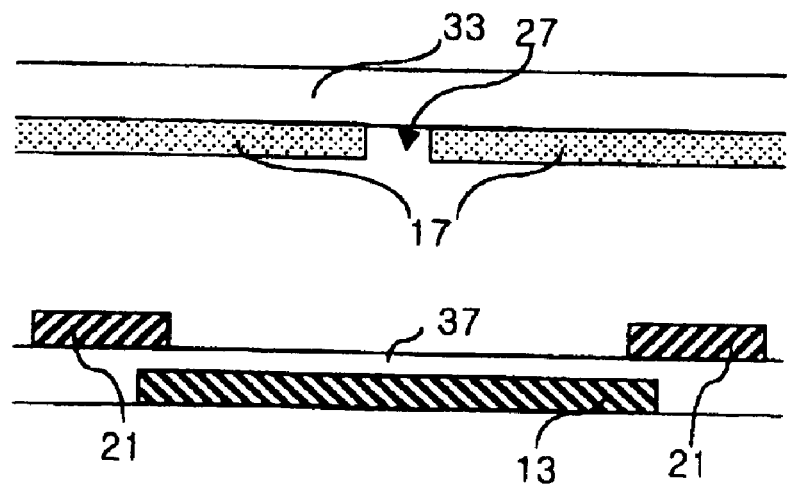

Reference will now be made in detail to the preferred embodiments of the present invention, examples of which are illustrated in the accompanying drawings.

A multi-domain liquid crystal display device of the present invention will be described with the accompanying drawings.

The multi-domain liquid crystal display device includes a first substrate 21, a second substrate 33, a plurality of data lines 3 and gate lines 1, a common auxiliary electrode 15, a thin film transistor, a passivation film 37, and a pixel electrode 13.

The data lines 3 and gate lines 1 are formed on the first substrate 21 lengthwise and crosswise to divide the first substrate into a plurality of pixel regions. The common auxiliary electrode 15 is formed on a layer equal to the gate lines to distort electric field. The thin film transistor is formed in each pixel region on the first substrate and includes a gate electrode 11, a gate insulating film 35, a semiconductor layer 5, an ohmic contact layer; and source and drain electrodes 7 and 9. The passivation film 37 is formed on an entire surface of the first substrate 31. The pixel electrode 13 is formed on the passivation film 37 to be connected with the drain electrode 9.

The multi-domain liquid crystal display device further includes a light-shielding layer 25, a color filter layer 23 formed on the light-shielding layer 25, a common electrode 17 formed on the color filter layer 25, and a liquid crystal layer formed between the first substrate 31 and the second substrate 33. The light-shielding layer 25 is formed on the second substrate 33 to shield light leaked from the gate lines 1, the data lines 3 and the thin film transistor.

Dielectric structures 53 patterned in at least two different forms within neighboring pixels are formed on the common electrode 17. An electric field induction window 51 having a hole or slit shape is formed within the pixel electrode 13.

To fabricate the aforementioned multi-domain liquid crystal display device, the thin film transistor consisting of the gate electrode 11, the gate insulating film 35, the semiconductor layer 5, the ohmic contact layer and the source and drain electrodes 7 and 9 is formed in each pixel region of the first substrate. At this time, the plurality of gate lines 1 and data lines 3 are formed to divide the first substrate into a plurality of pixel regions.

The gate electrode 11 and gate lines 1 are formed in such a manner that metals such as Al, Mo, Cr, Ta, Al alloy or their alloys are layered by sputtering and patterned. At the same time, the common auxiliary electrode 15 is formed to surround the pixel region. Then, the gate insulating film 35 is formed in such a manner that $SiN_x$ or $SiO_x$ is deposited on the common auxiliary electrode 15 by plasma enhancement chemical vapor deposition (PECVD) method and patterned. Subsequently, the semiconductor layer 5 and the ohmic contact layer are formed in such a manner that a-Si and n+a-Si are deposited by PECVD method and patterned. Furthermore, the gate insulating film 35, a-Si and n+a-Si may successively be deposited and patterned. Metals such as Al, Mo, Cr, Ta, Al alloy or their alloys are layered by sputtering and patterned so that the data lines 3 and the source and drain electrodes 7 and 9 are formed.

At this time, a storage electrode is formed to overlap the gate lines 1 and/or the common auxiliary electrode 15. The storage electrode acts as a storage capacitor together with the gate lines 1 and/or the common auxiliary electrode 15.

Subsequently, the passivation film 37 is formed of a material BCB (BenzoCycloButene), acrylic resin, polyimide, $SiN_x$ or $SiO_x$ on the first substrate 31. A metal such as indium tin oxide(ITO), Al or Cr is deposited sputtering and patterned to form the pixel electrode 13. At this time, the pixel electrode 13 is connected with the drain electrode and the storage electrode through a contact hole and patterned in various forms to form an electric field induction window 51 therein.

When the common auxiliary electrode 15 is formed of the same material as the gate lines 1, it is formed on the same layer as the gate lines 1 and connected with the common electrode 17 using one mask. An additional mask may be used to form other metal or different double layers.

Additionally, the common auxiliary electrode 15 and the pixel electrode 13 may be overlapped with each other and vice versa. At this time, the common auxiliary electrode 15 and the pixel electrode 13 forms a storage capacitor.

The light-shielding layer 25 is formed on the second substrate 33, and the color filter layer 23 is formed to repeat R(red), G(green) and B(blue) elements for each pixel. The common electrode 17 is formed of a transparent electrode such as ITO on the color filter layer 23, in the same manner as the pixel electrode 13. A photoresist material is deposited on the common electrode 17 and patterned by photolithography to form dielectric structures 53 having various shapes. The dielectric structures are patterned in different shapes within neighboring pixels and two or more pixels are formed to repeat in one unit. Thus, a multi-domain is realized.

Subsequently, a liquid crystal injected between the first substrate 31 and the second substrate 33 so that a multi-domain liquid crystal display device is completed.

Preferably, the dielectric structures 53 have dielectric constants equal to or smaller than the liquid crystal layer, and more preferably 3 or below. A material such as photoacrylate or BCB may be used as the dielectric structures.

To apply a voltage $V_{com}$ to the common auxiliary electrode 15, an Ag-Dotting portion is formed in each corner of a driving region of the liquid crystal display device on the first substrate 31, and the electric field is applied to the second substrate 33 to drive the liquid crystal by the potential difference between upper and lower substrates. The Ag-Dotting portion of each corner is connected with the common auxiliary electrode 15. Thus, the voltage $V_{com}$ is applied to the common auxiliary electrode 15. This process is performed when forming the common auxiliary electrode 15.

High molecules are formed on at least one of the first substrate 31 and the second substrate 33 so that a phase difference film 29 is formed.

The phase difference film 29 is a negative uniaxial film and acts to compensate a viewing angle of a user.

Therefore, a region having no gray inversion is expanded, contrast ratio in incline direction increases, and a multi-domain is formed by one pixel. Thus, a viewing angle in left and right direction can effectively be compensated.

In addition to the negative uniaxial film, a negative biaxial film may be formed as the phase difference film. The negative biaxial film having two axes can obtain viewing angle characteristic wider than the negative uniaxial film.

Subsequently, a polarizer (not shown) is attached on both substrates. The polarizer may be formed in an integral form with the phase difference film.

In the multi-domain liquid crystal display device of FIG. 2, the common auxiliary electrode 15 is formed to surround the pixel region. The dielectric structure in one pixel is formed in horizontal direction while the dielectric structure in a neighboring pixel is formed in vertical direction. Thus, four domains are formed by a simple pattern.

Figure 2A:
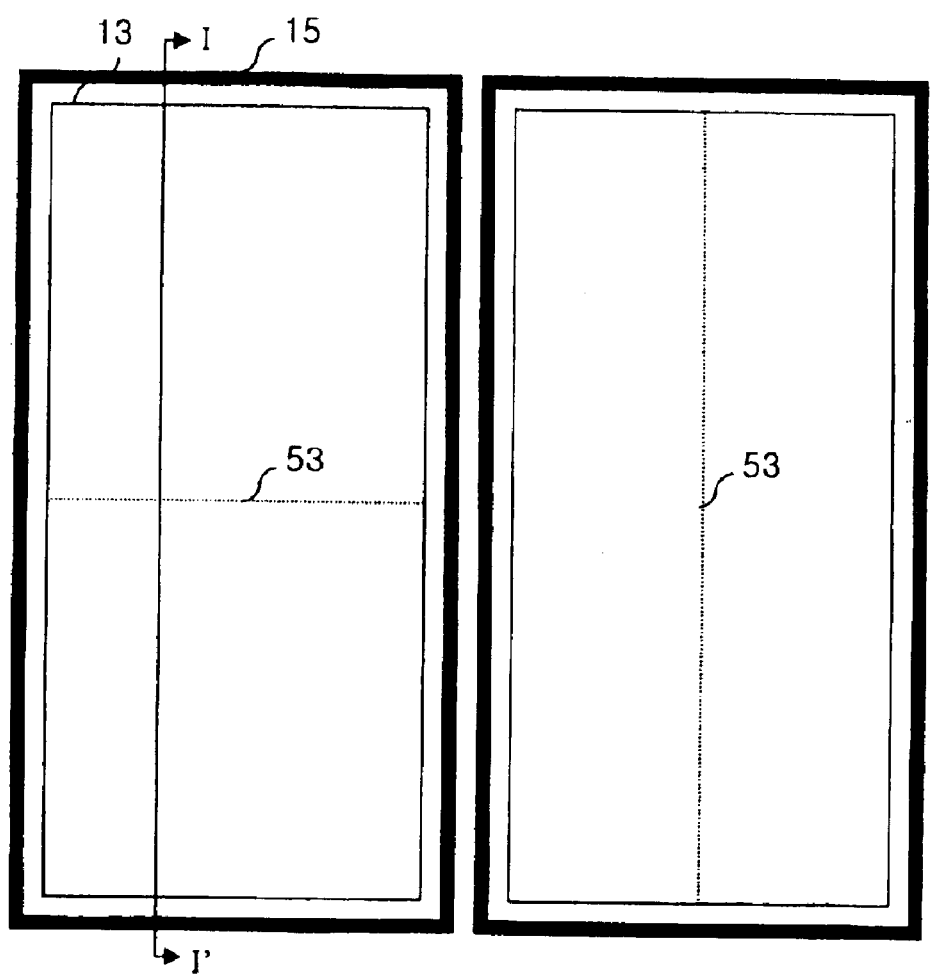
FIG. 2a is a plane view showing a multi-domain liquid crystal display device according to the first embodiment of the present invention.
Figure 2B:
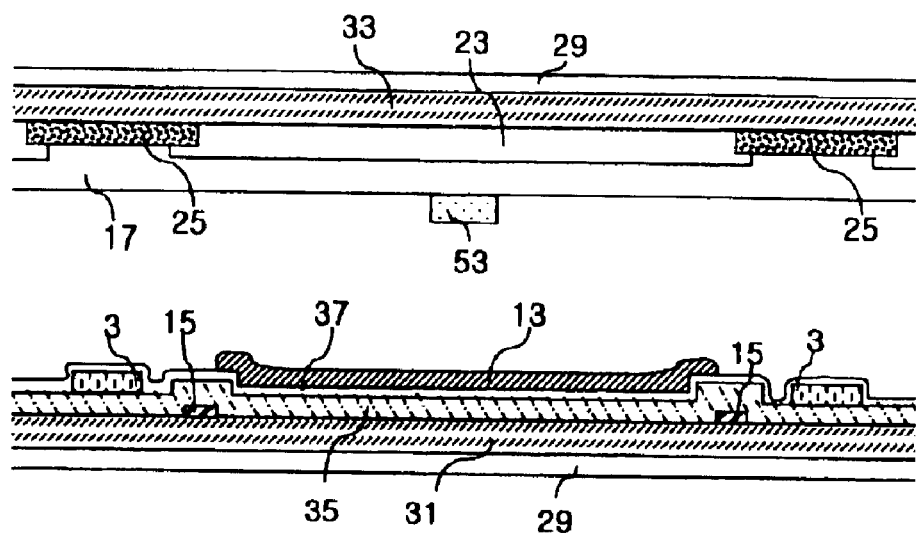
FIGS. 2b to 2e are sectional views showing a multi-domain liquid crystal display device according to the first embodiment of the present invention.
Figure 2C:
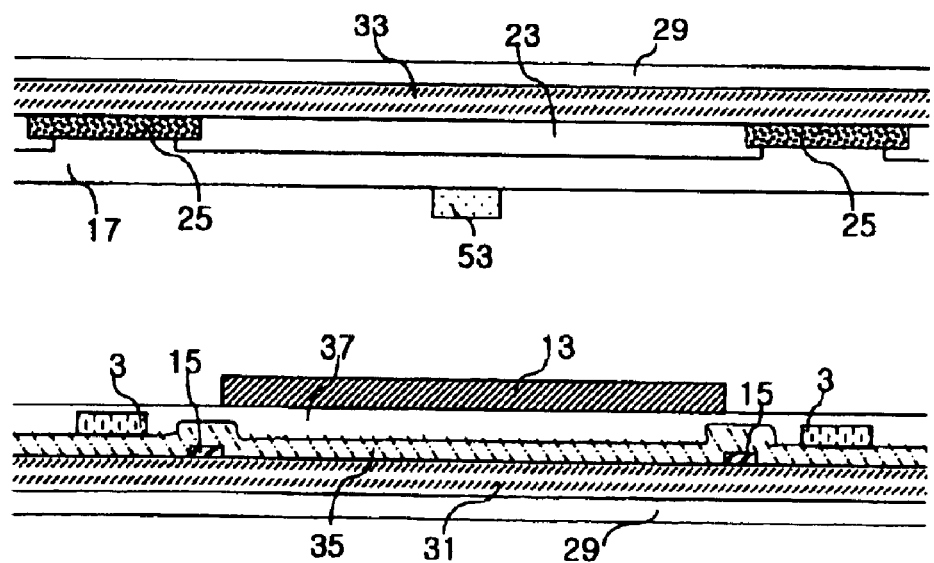
Figure 2D:
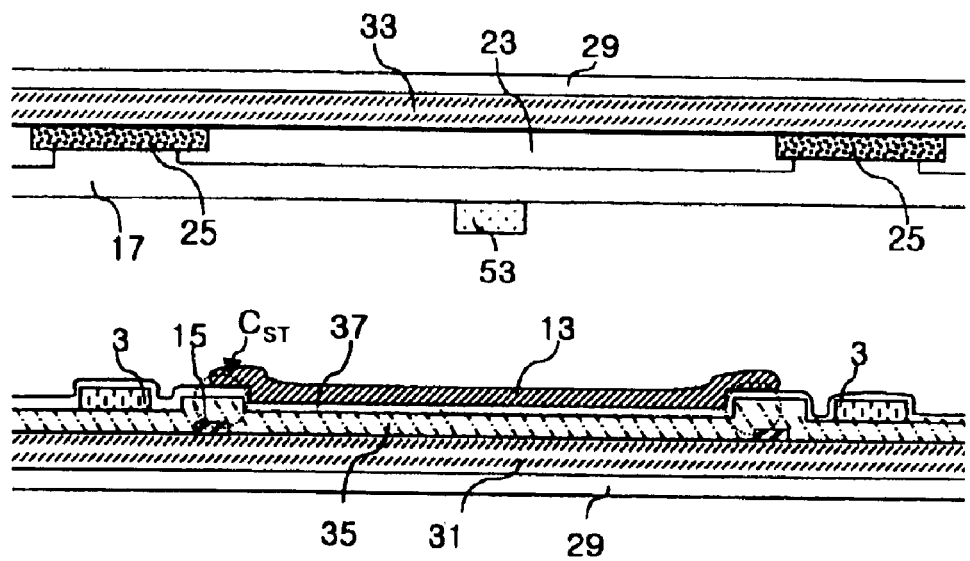
Figure 2E:
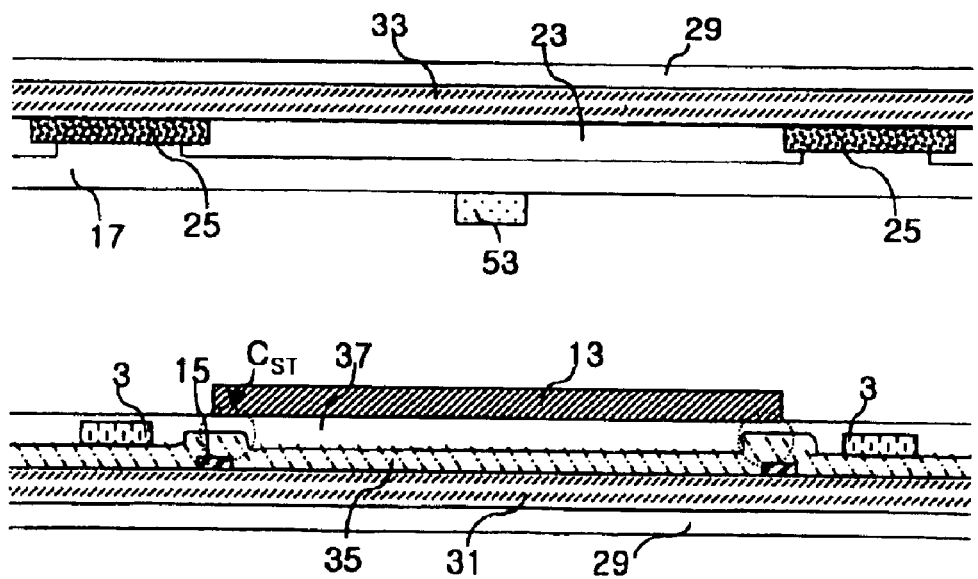

FIGS. 2b and 2d, the passivation film 37 is formed of a material such as $SiN_x$ or $SiO_x$. In FIGS. 2c and 2e, the passivation film 37 is formed of BCB, acrylic resin or polyimide.

In the multi-domain liquid crystal display device of FIGS. 2d and 2e, the pixel electrode 13 overlaps the common auxiliary electrode 15 to form a storage capacitor. The light-shielding layer 25 also overlaps the common auxiliary electrode. Accordingly, an aperture ratio is high. In the multi-domain liquid crystal display device shown in FIGS. 2b and 2c, the pixel electrode 13 does not overlap the common auxiliary electrode 15 and the light-shielding layer 25 overlaps the pixel electrode so that leakage of light is avoided.

In the multi-domain liquid crystal display device shown in FIG. 3, the common auxiliary electrode 15 is formed to surround the pixel region. The dielectric structure 53 in one pixel is formed in horizontal direction while the dielectric structure in a neighboring pixel is formed in vertical direction. Moreover, an electric field induction window 51 of a hole or slit is formed in the pixel electrode 13. Thus, the multi-domain liquid crystal display device having an improved characteristic as compared with the first embodiment is obtained.

Figure 3A:
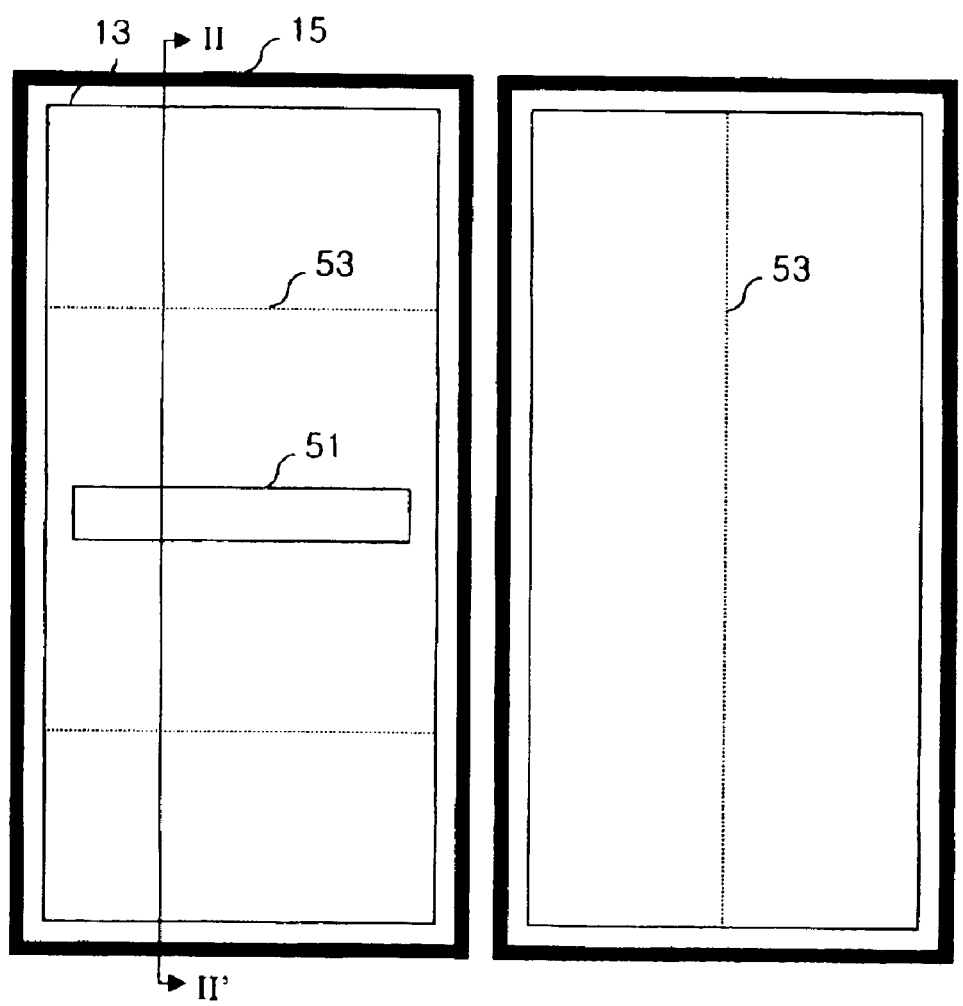
FIG. 3a is a plane view showing a multi-domain liquid crystal display device according to the second embodiment of the present invention.
Figure 3B:
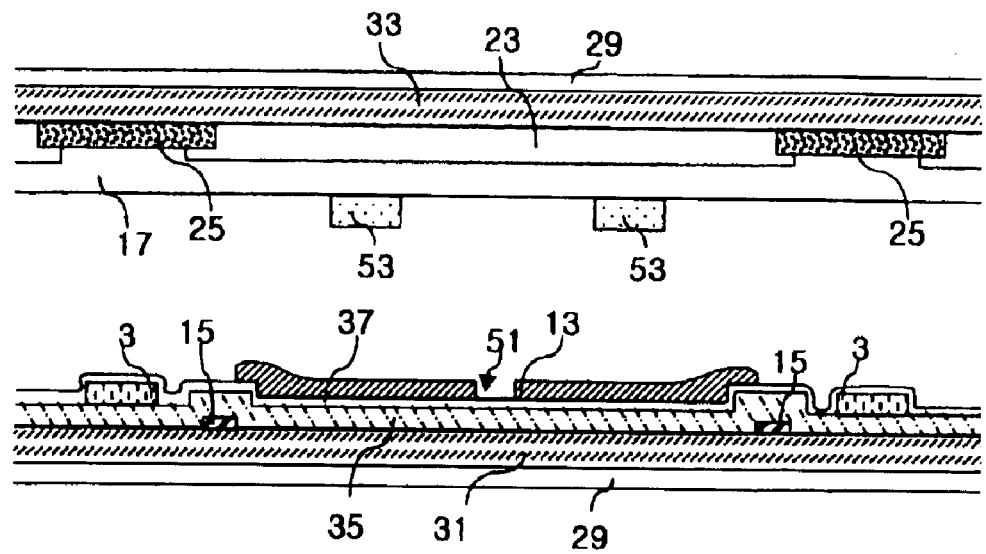
FIGS. 3b to 3e are sectional views showing a multi-domain liquid crystal display device according to the second embodiment of the present invention.
Figure 3C:
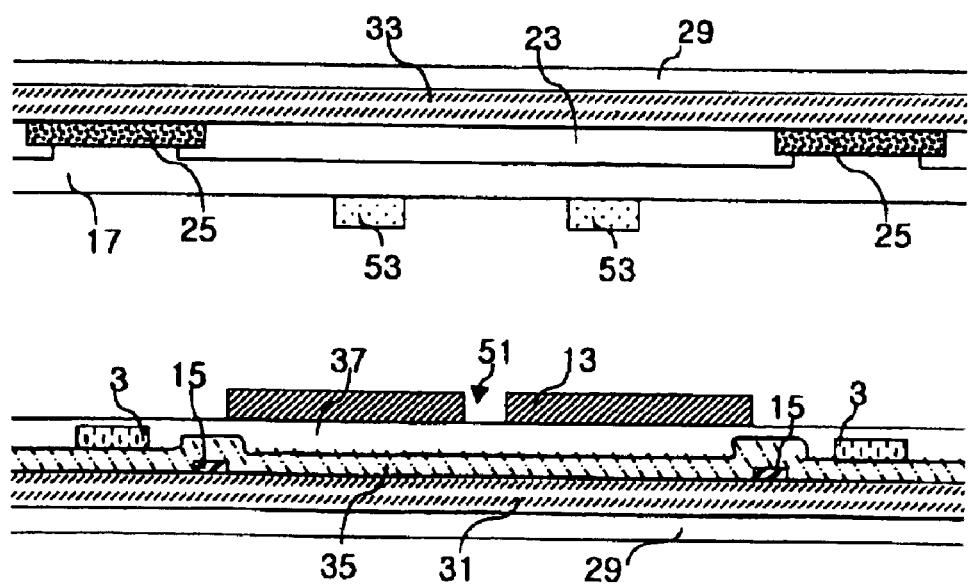
Figure 3D:
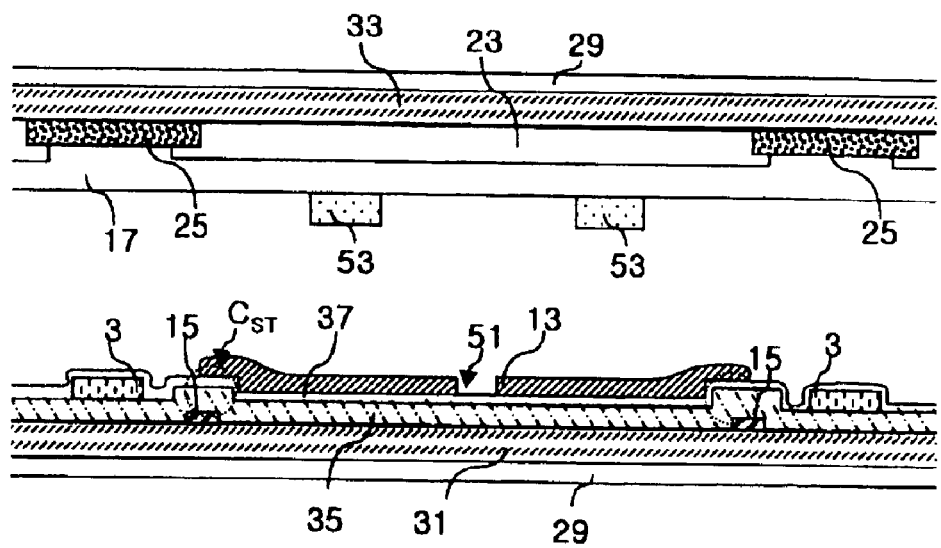
Figure 3E:
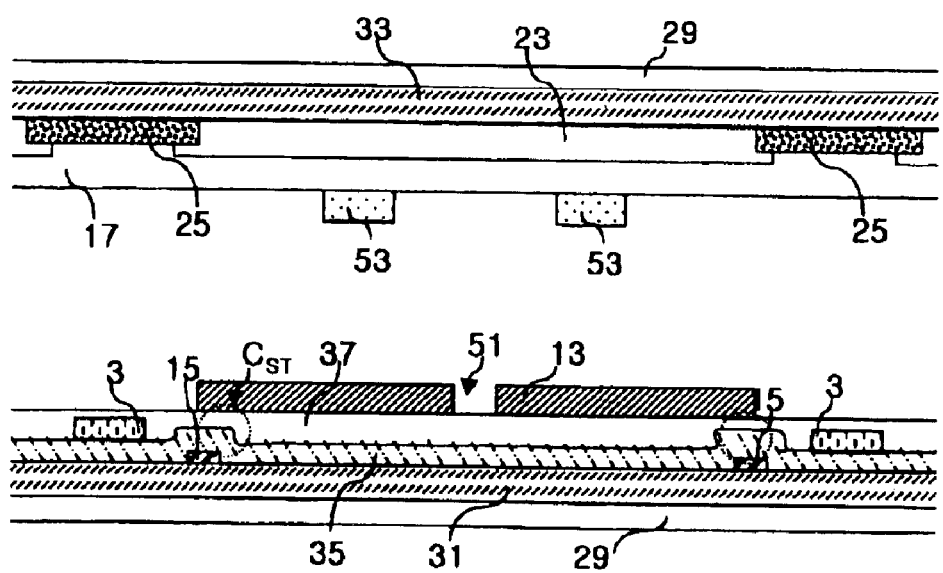

Furthermore, in FIGS. 3b and 3d, the passivaiton film 37 is formed of a material such as SiNx or SiOx. In FIGS. 3c and 3e, the passivation film is formed of BCB, acrylic resin or polyimide.

In the multi-domain liquid crystal display device of FIGS. 3d and 3e, the pixel electrode 13 overlaps the common auxiliary electrode 15 to form a storage capacitor. The light-shielding layer 25 also overlaps the common auxiliary electrode. Accordingly, an aperture ratio is high. In the multi-domain liquid crystal display device shown in FIGS. 3b and 3c, the pixel electrode 13 does not overlap the common auxiliary electrode 15 and the light-shielding layer 25 overlaps the pixel electrode so that leakage of light is avoided.

In the multi-domain liquid crystal display device shown in FIG. 4, the common auxiliary electrode. 15 is formed to surround the pixel region. The dielectric structure 53 in one pixel is formed in horizontal direction while the dielectric structure in a neighboring pixel is formed in vertical direction. Moreover, two or more electric field induction windows 51 of holes or slits are formed in the pixel electrode 13. Thus, the multi-domain liquid crystal display device of FIG. 4 has an improved characteristic as compared with the second embodiment.

Figure 4A:
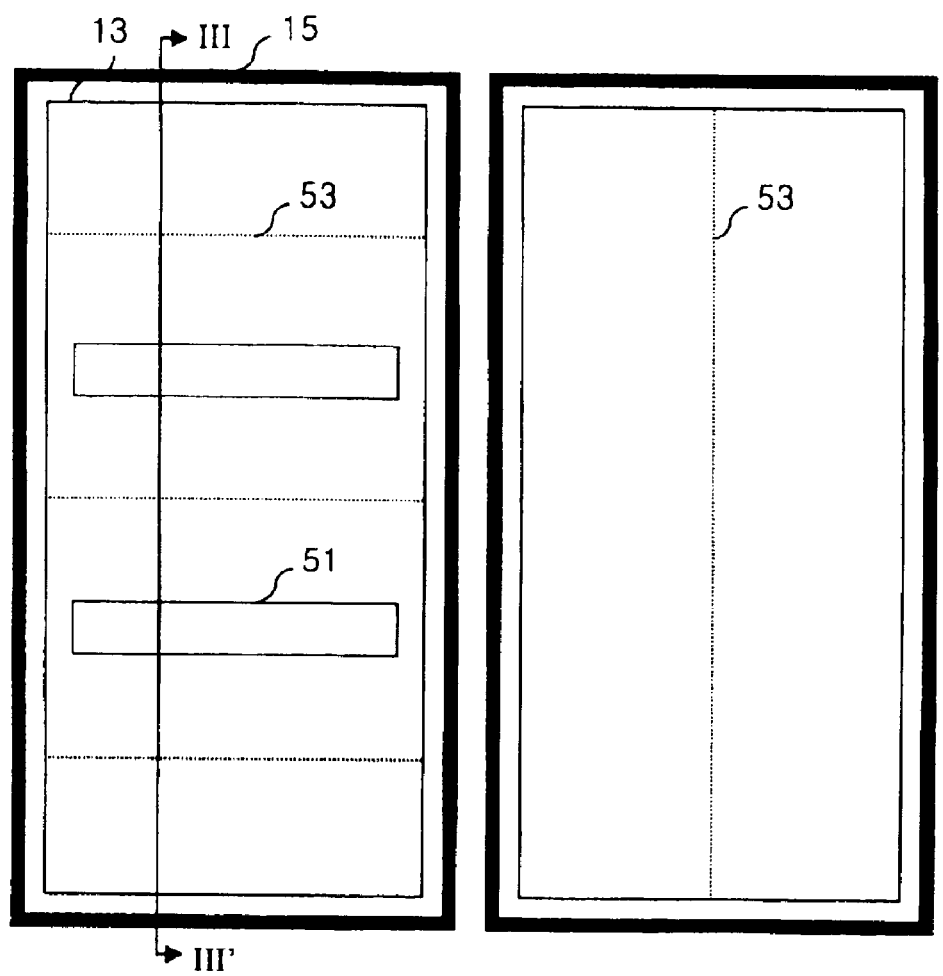
FIG. 4a is a view showing a multi-domain liquid crystal display device according to the third embodiment of the present invention.
Figure 4B:
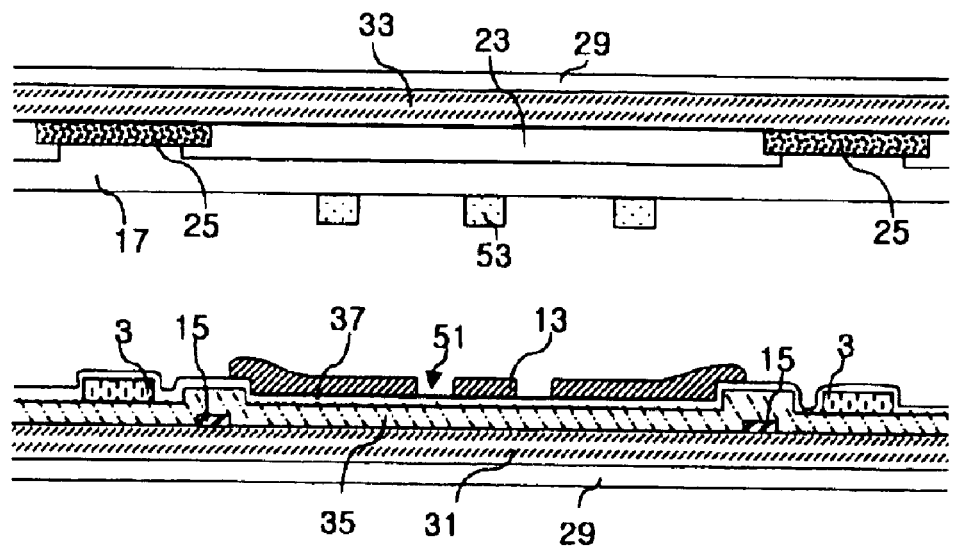
FIGS. 4b to 4e are sectional views showing a multi-domain liquid crystal display device according to the third embodiment of the present invention.
Figure 4C:
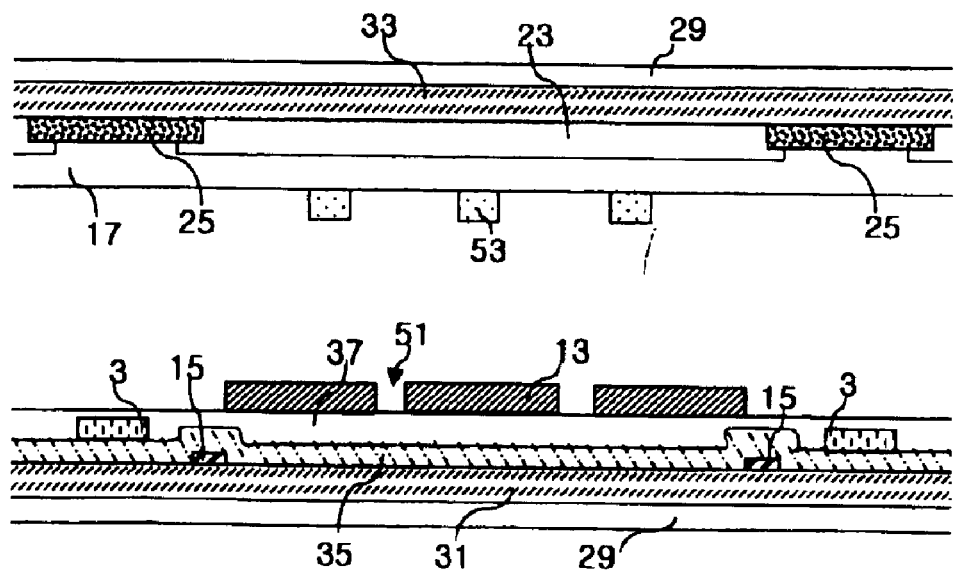
Figure 4D:
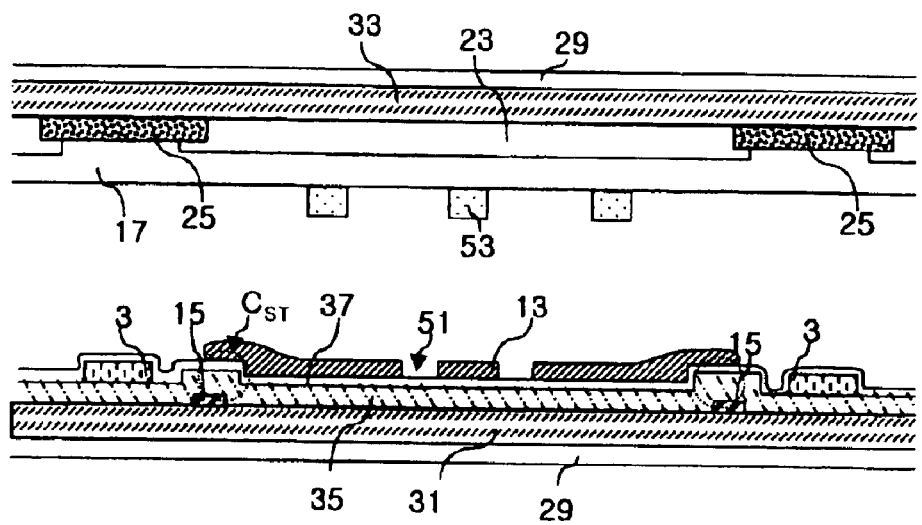
Figure 4E:
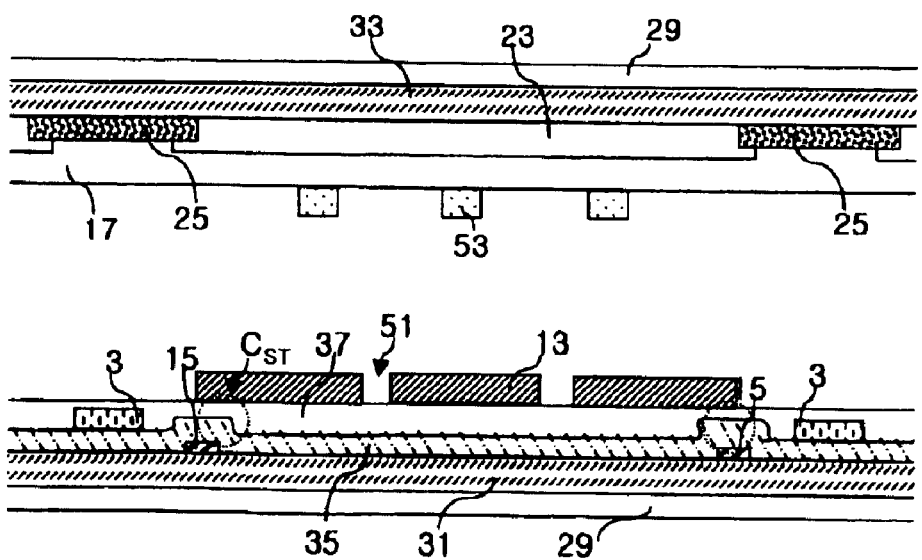

Furthermore, in FIGS. 4b and 4d, the passivation film 37 is formed of a material such as $SiN_x$ or $SiO_x$. In FIGS. 4c and 4e, the passivation film 37 is formed of BCB, acrylic resin or polyimide.

In the multi-domain liquid crystal display device of FIGS. 4d and 4e, the pixel electrode 13 overlaps the common auxiliary electrode 15 to form a storage capacitor. The light-shielding layer 25 also overlaps the common auxiliary electrode. Accordingly, an aperture ratio is high. In the multi-domain liquid crystal display device shown in FIGS. 4b and 4c, the pixel electrode 13 does not overlap the common auxiliary electrode 15 and the light-shielding layer 25 overlaps the pixel electrode so that leakage of light is avoided.

In the multi-domain liquid crystal display device shown in FIG. 5, the dielectric structure 53 in one pixel is formed in horizontal direction and an electric field induction window 51 of a hole or slit is formed in the pixel electrode 13. The common auxiliary electrode 15 is formed in a region where the electric field induction window is formed and around the pixel region. Thus, the multi-domain liquid crystal display device having an improved characteristic as compared with the above embodiments is obtained.

Figure 5A:
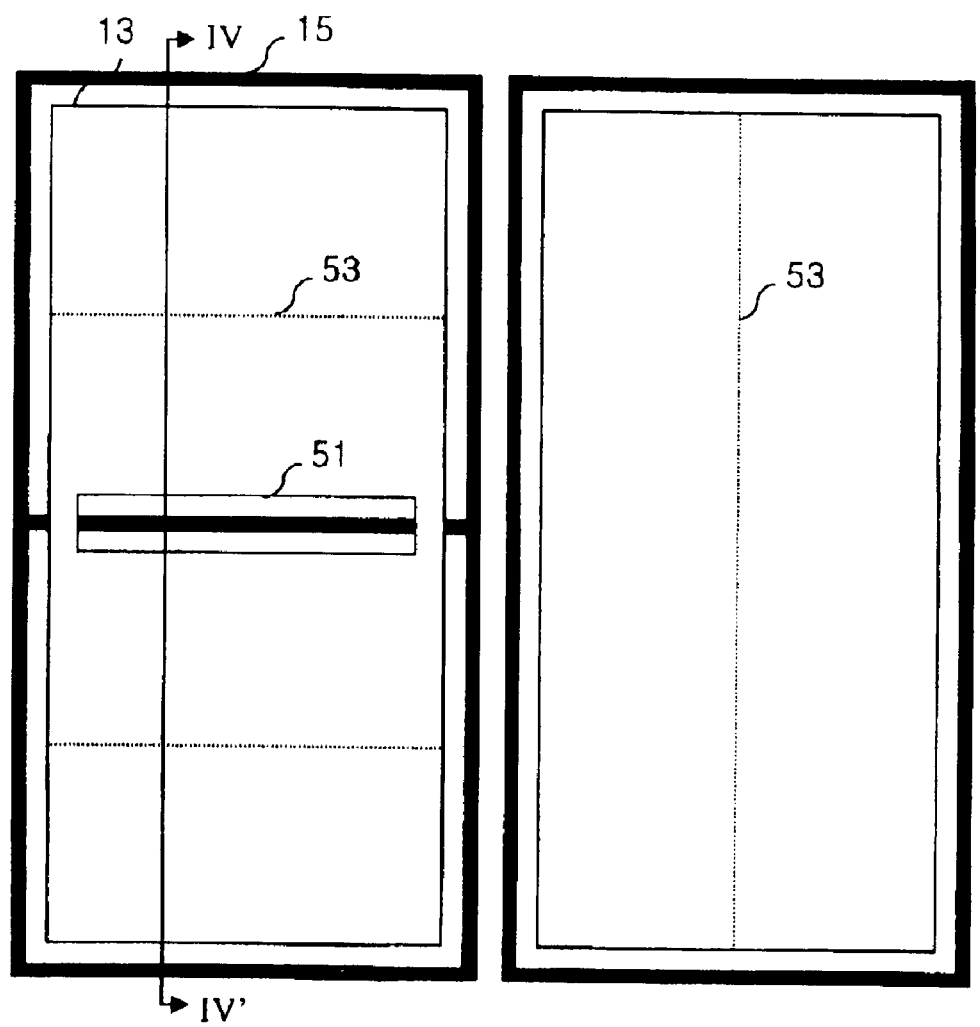
FIG. 5a is a plane view showing a multi-domain liquid crystal display device according to the fourth embodiment of the present invention.
Figure 5B:
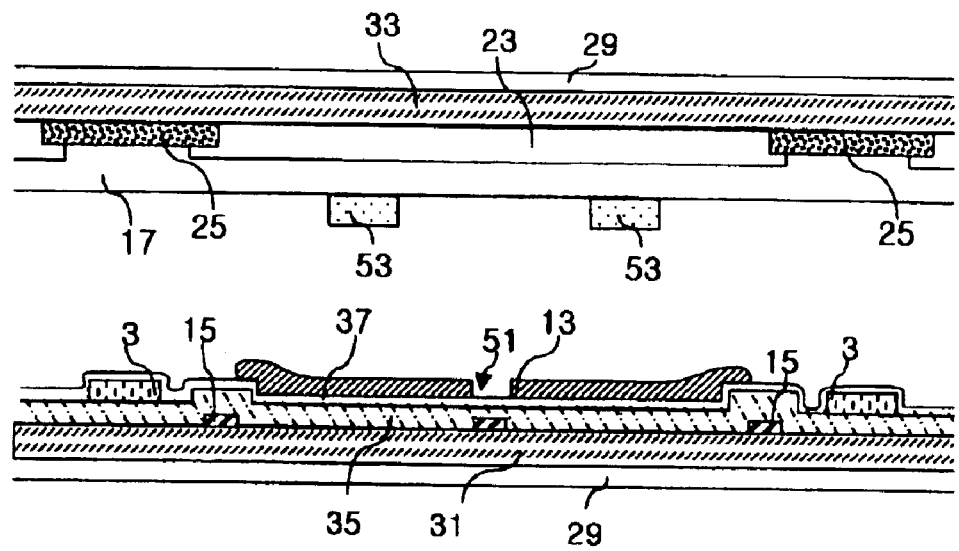
FIGS. 5b to 5e are sectional views showing a multi-domain liquid crystal display device according to the fourth embodiment of the present invention.
Figure 5C:
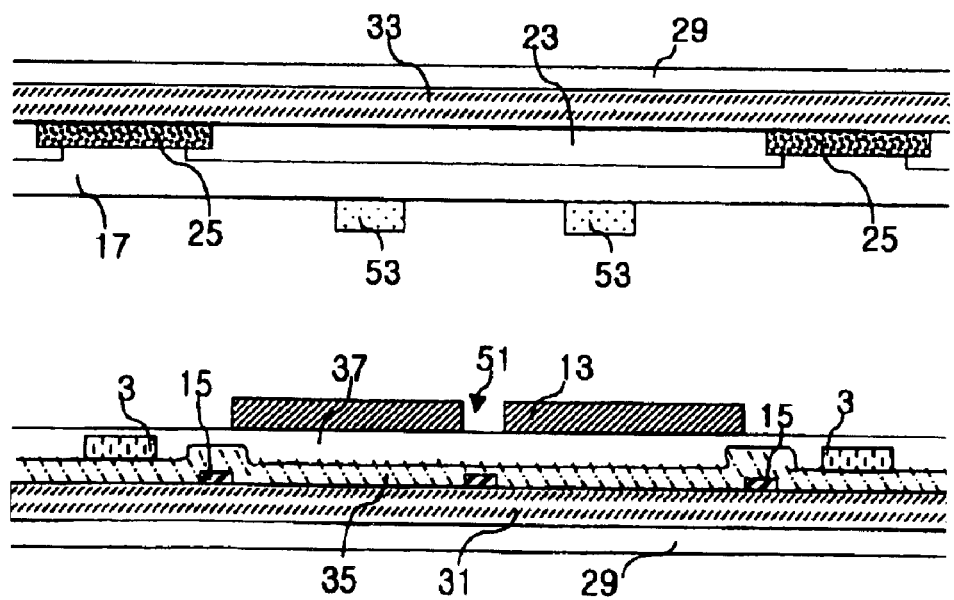
Figure 5D:
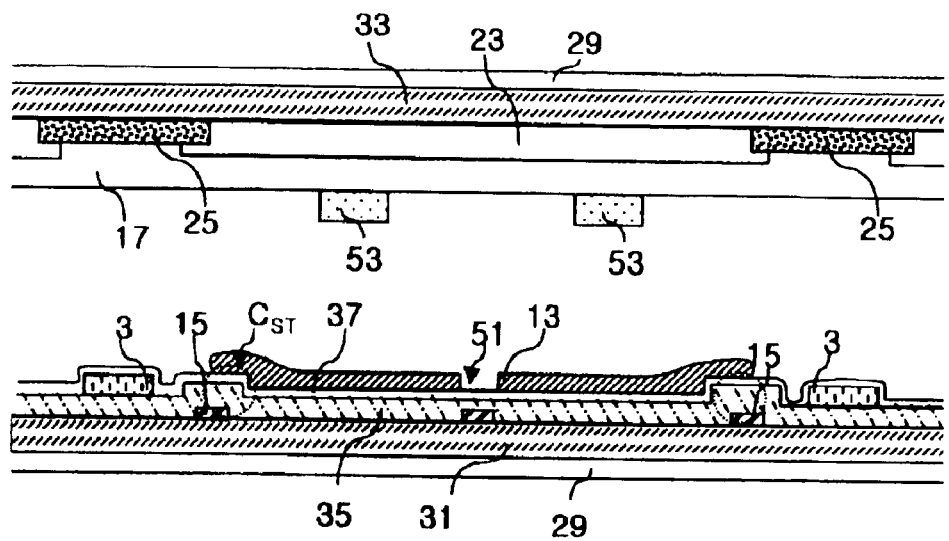
Figure 5E:
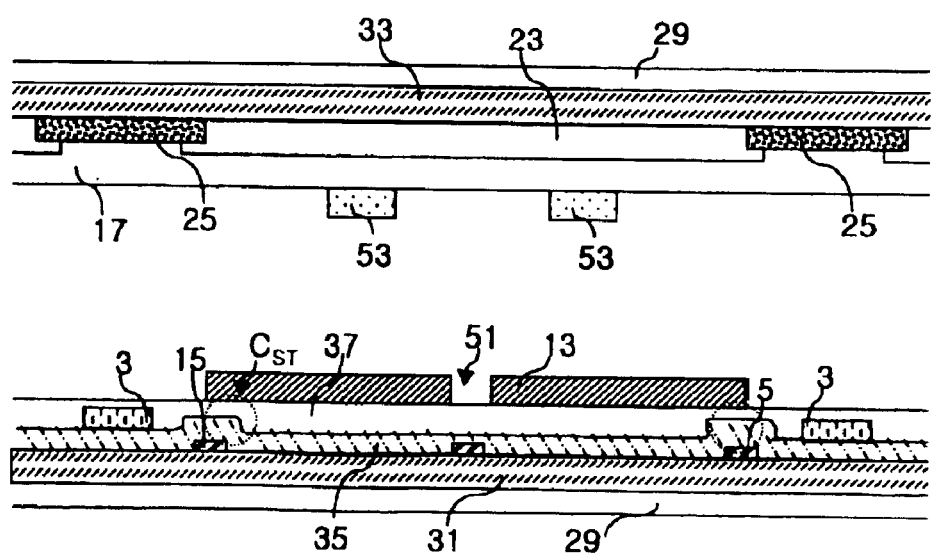

Furthermore, in FIGS. 5b and 5d, the passivation film 37 is formed of a material such as SiNx or SiOx. In FIGS. 5c and 5e, the passivation film 37 is formed of BCB, acrylic resin or polyimide.

In the multi-domain liquid crystal display device of FIGS. 5d and 5e, the pixel electrode 13 overlaps the common auxiliary electrode 15 to form a storage capacitor. The light-shielding layer 25 also overlaps the common auxiliary electrode. Accordingly, an aperture ratio is high. In the multi-domain liquid crystal display device shown in FIGS. 5b and 5c, the pixel electrode 13 does not overlap the common auxiliary electrode 15 and the light-shielding layer 25 overlaps the pixel electrode so that leakage of light is avoided.

In the multi-domain liquid crystal display device shown in FIG. 6, the dielectric structure 53 in one pixel is formed in horizontal direction while the dielectric structure in a neighboring pixel is formed in vertical direction. Moreover, two or more electric field induction windows 51 of holes or slits are formed in the pixel electrode 13. The common auxiliary electrode 15 is formed in a region where the electric field induction windows are formed and around the pixel region. Thus, the multi-domain liquid crystal display device of FIG. 4 has an improved characteristic as compared with the fourth embodiment.

Figure 6A:
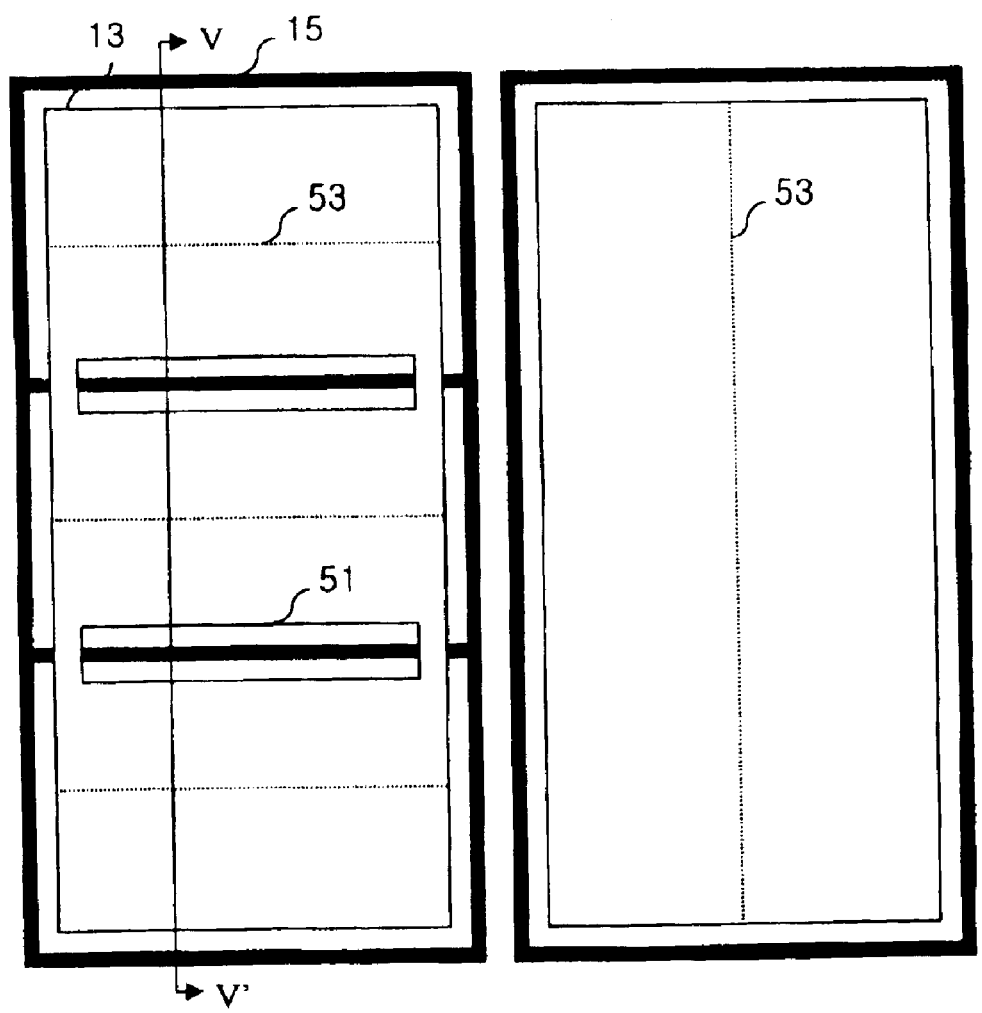
FIG. 6a is a plan view showing a multi-domain liquid crystal display device according to the fifth embodiment of the present invention.
Figure 6B:
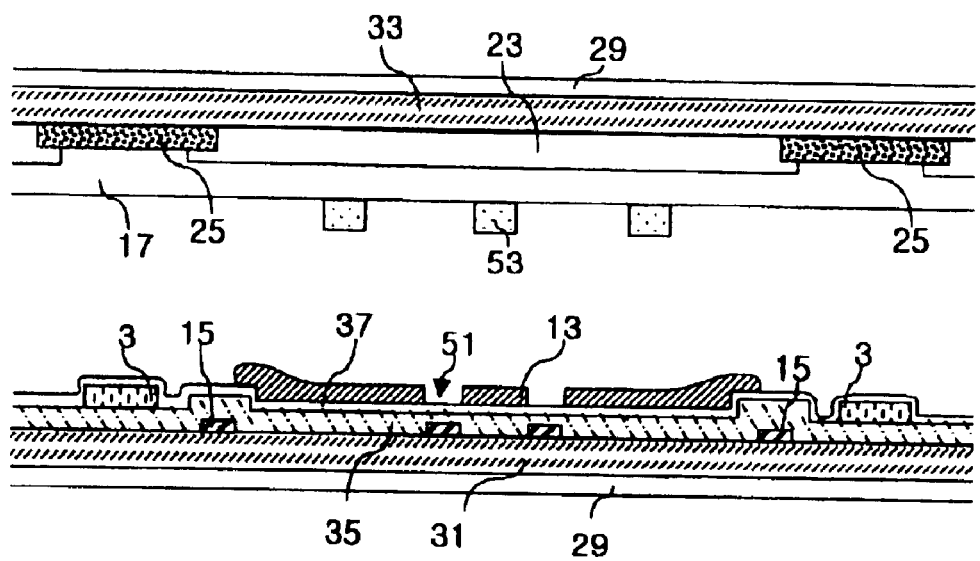
FIGS. 6b to 6e are sectional views showing a multi-domain liquid crystal display device according to the fifth embodiment of the present invention.
Figure 6C:
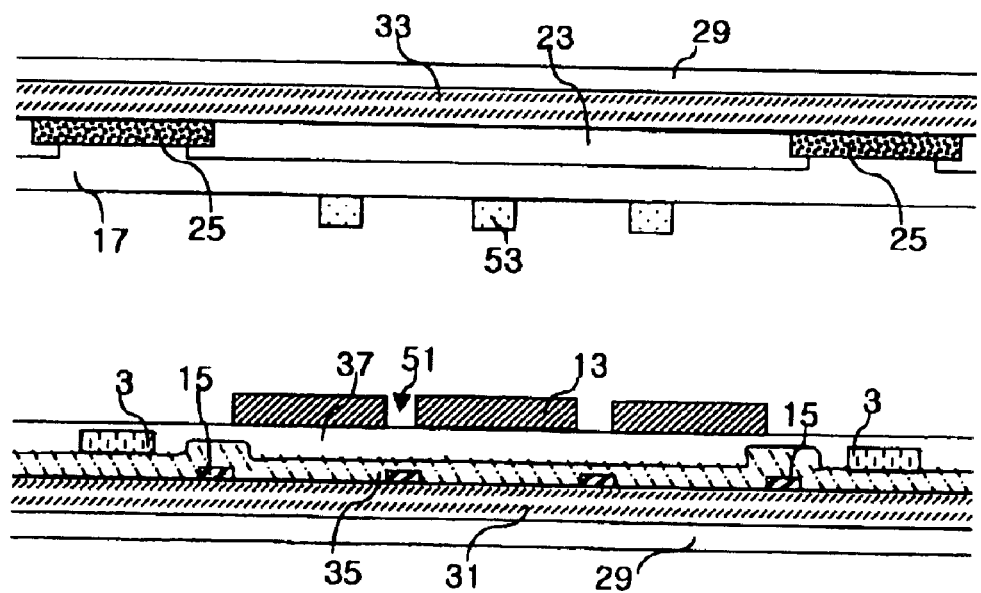
Figure 6D:
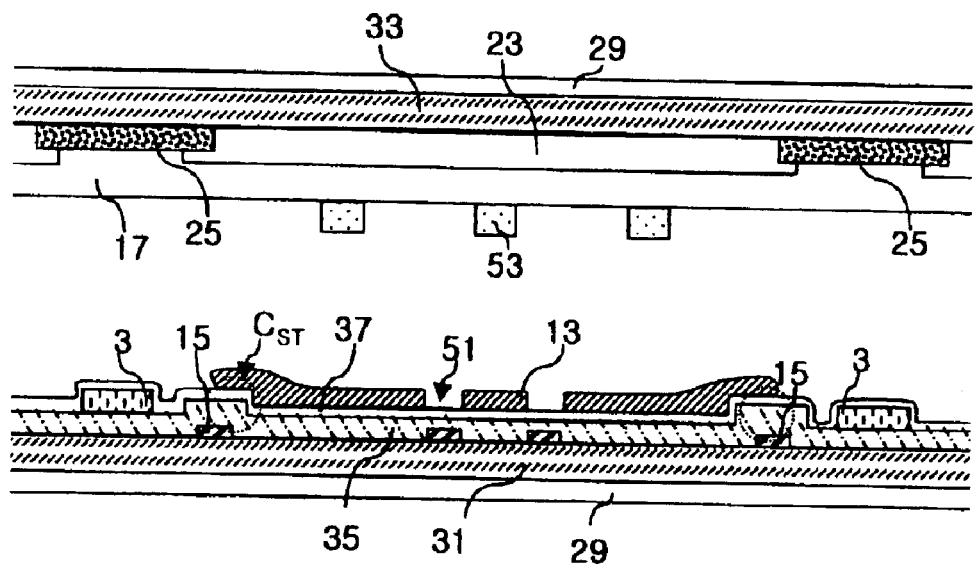
Figure 6E:
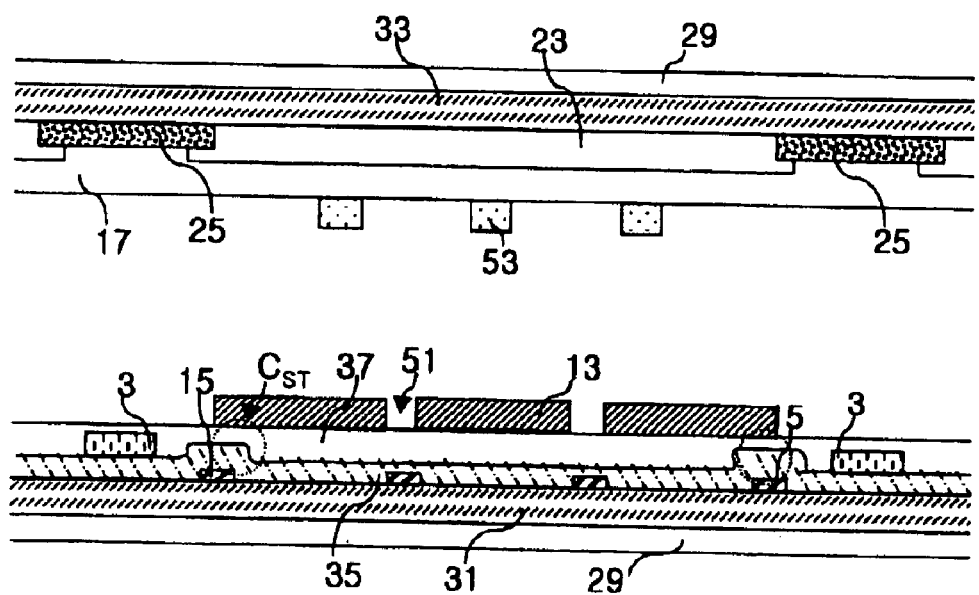
Figure 7B:
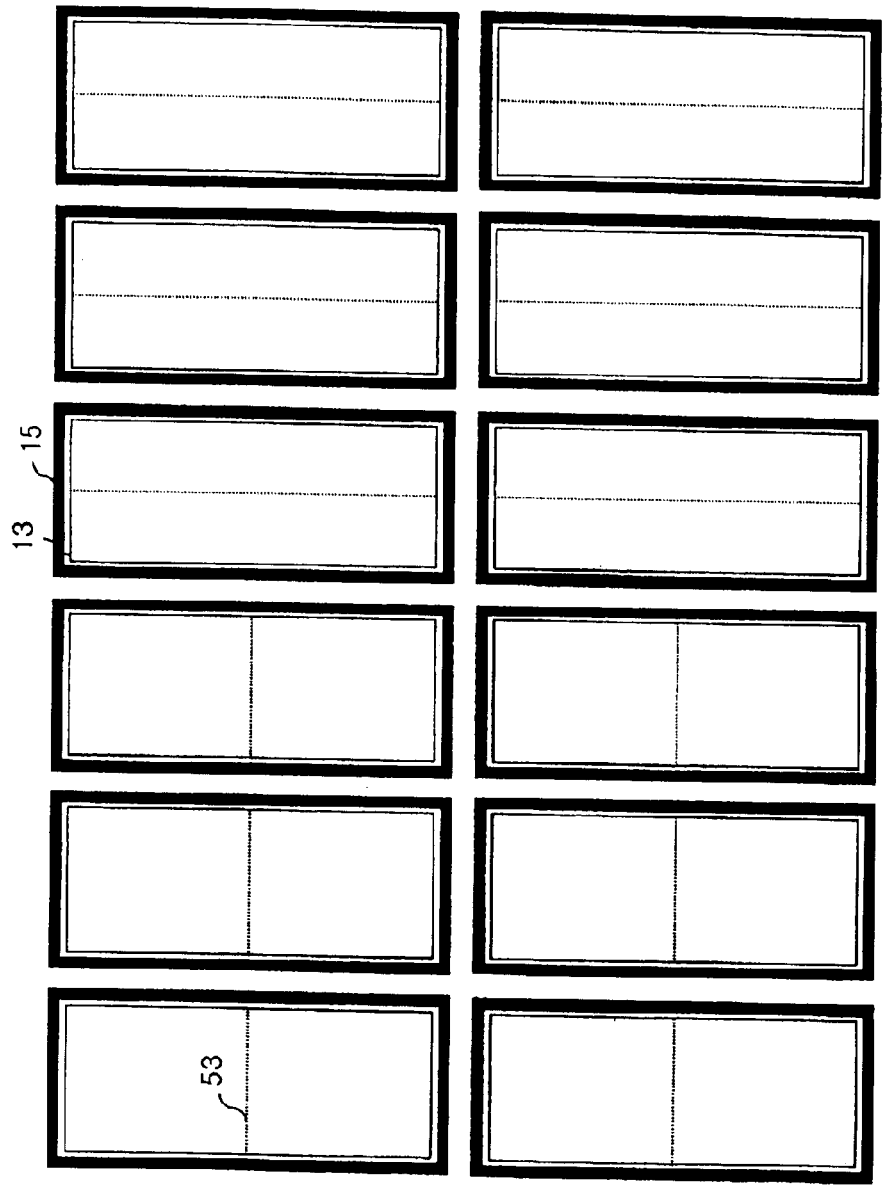
Figure 7C:
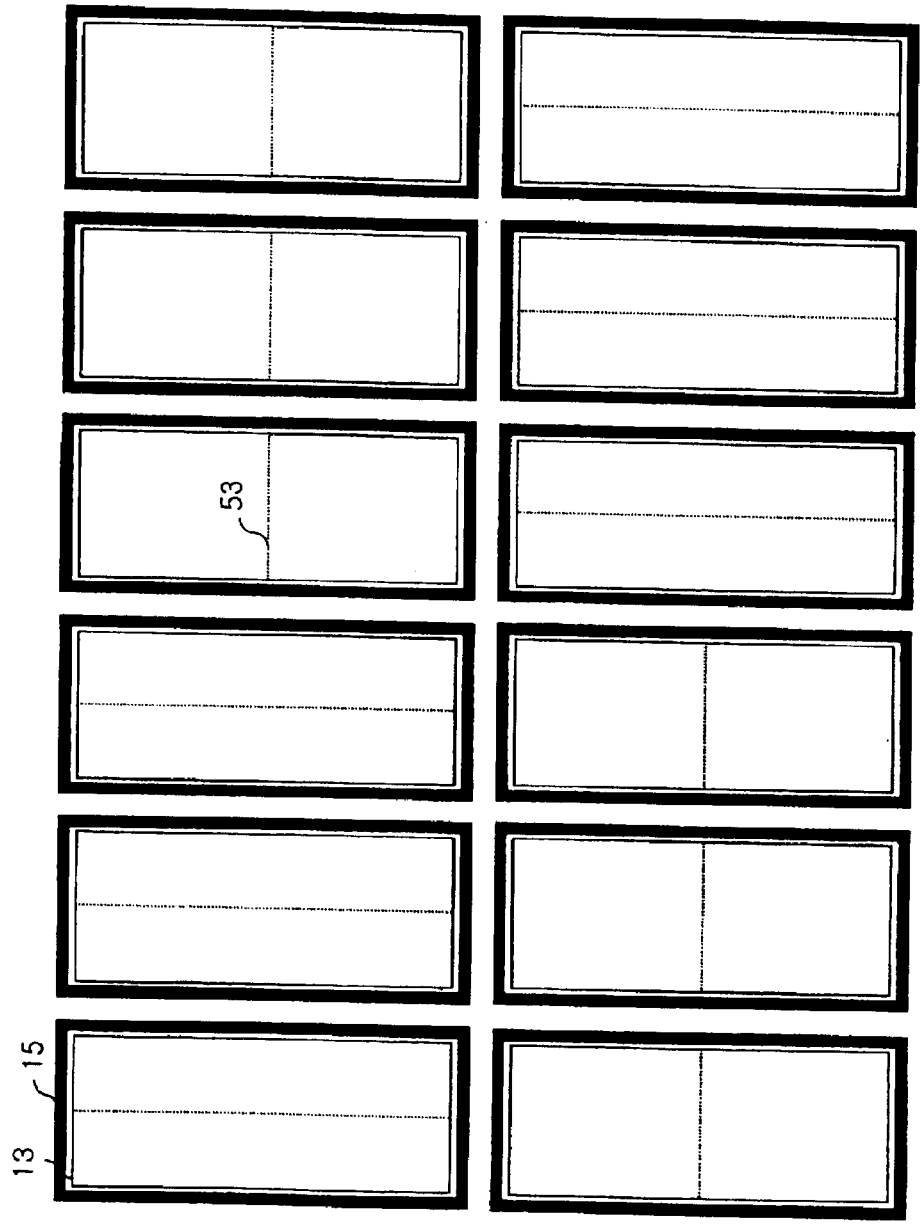
Figure 7D:
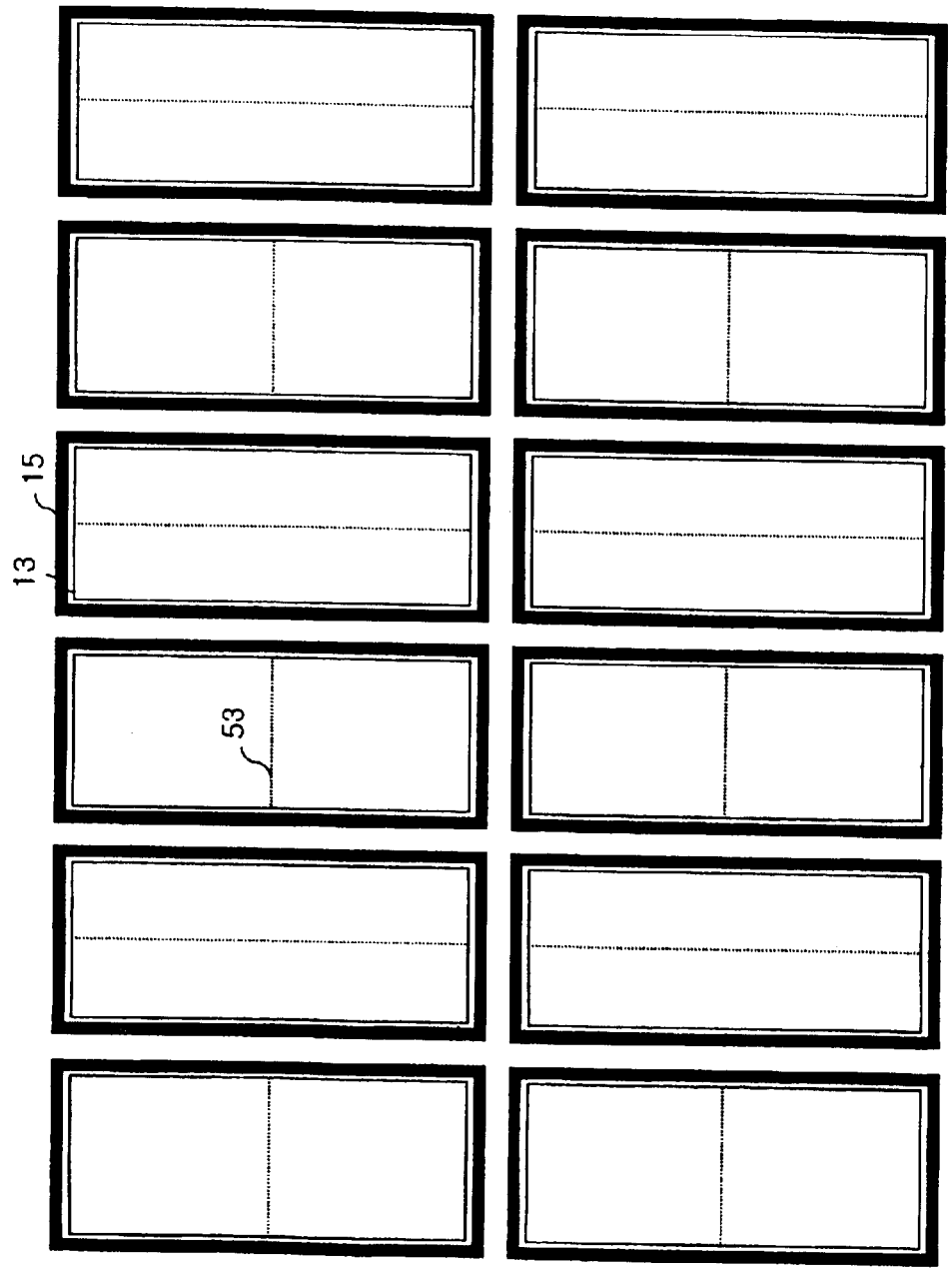
Figure 7E:
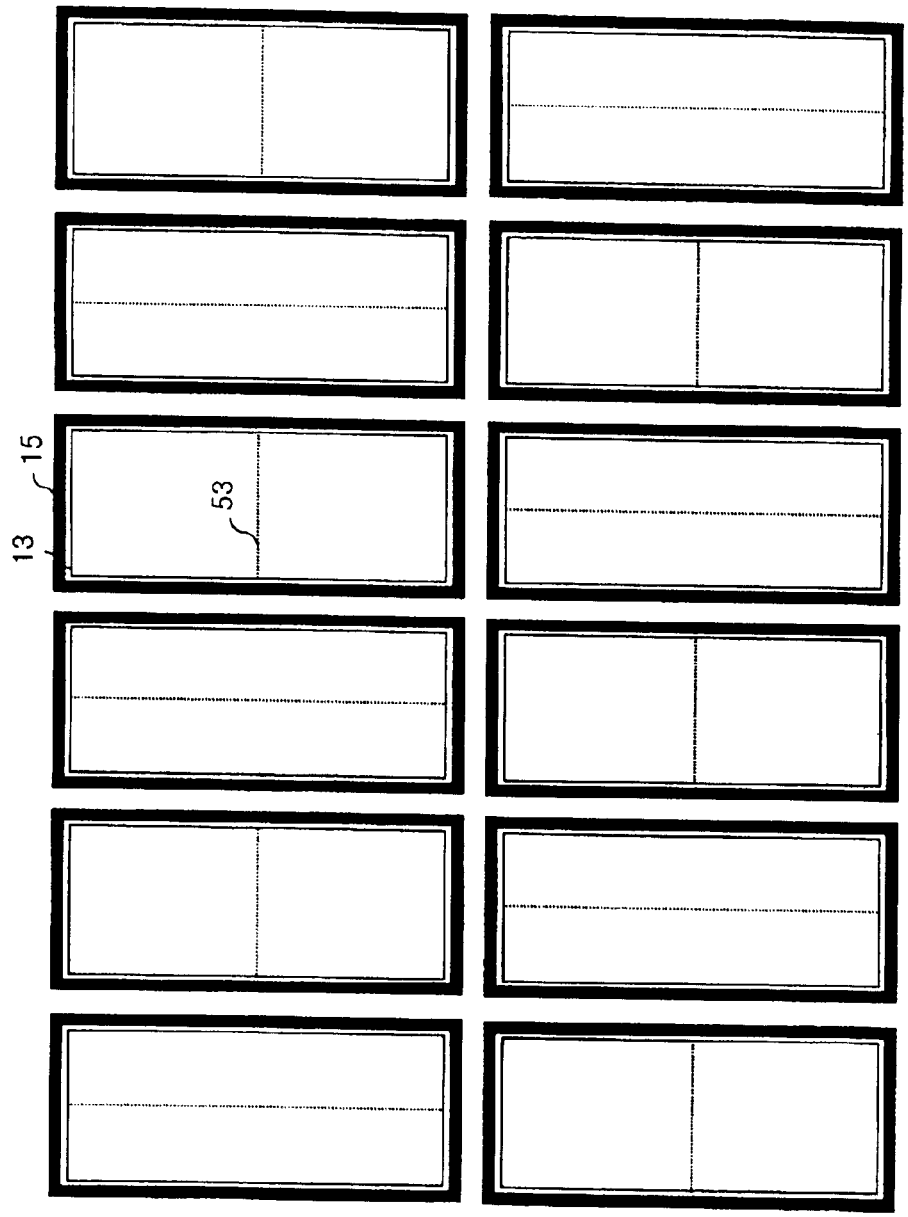
Figure 8C:
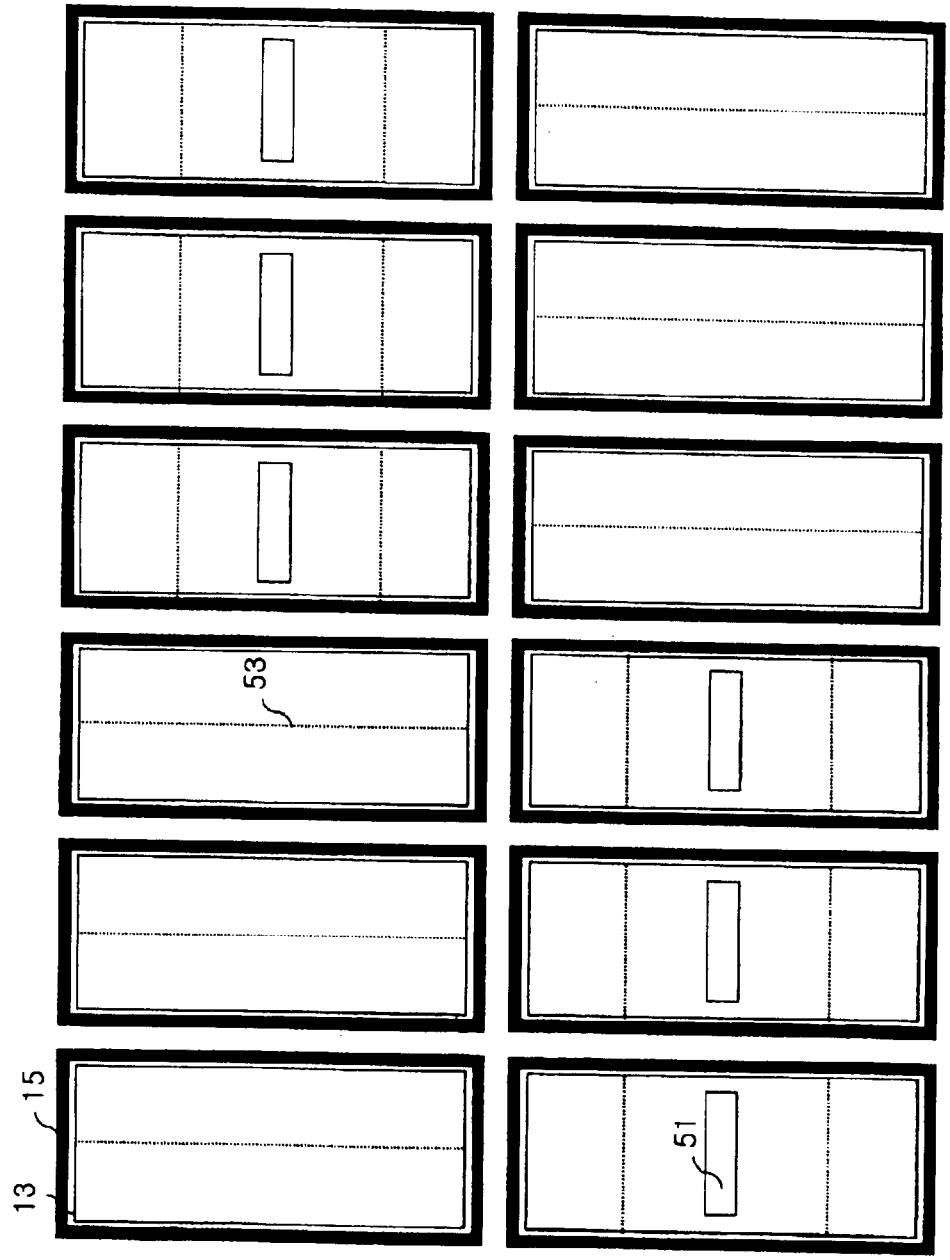
Figure 8D:
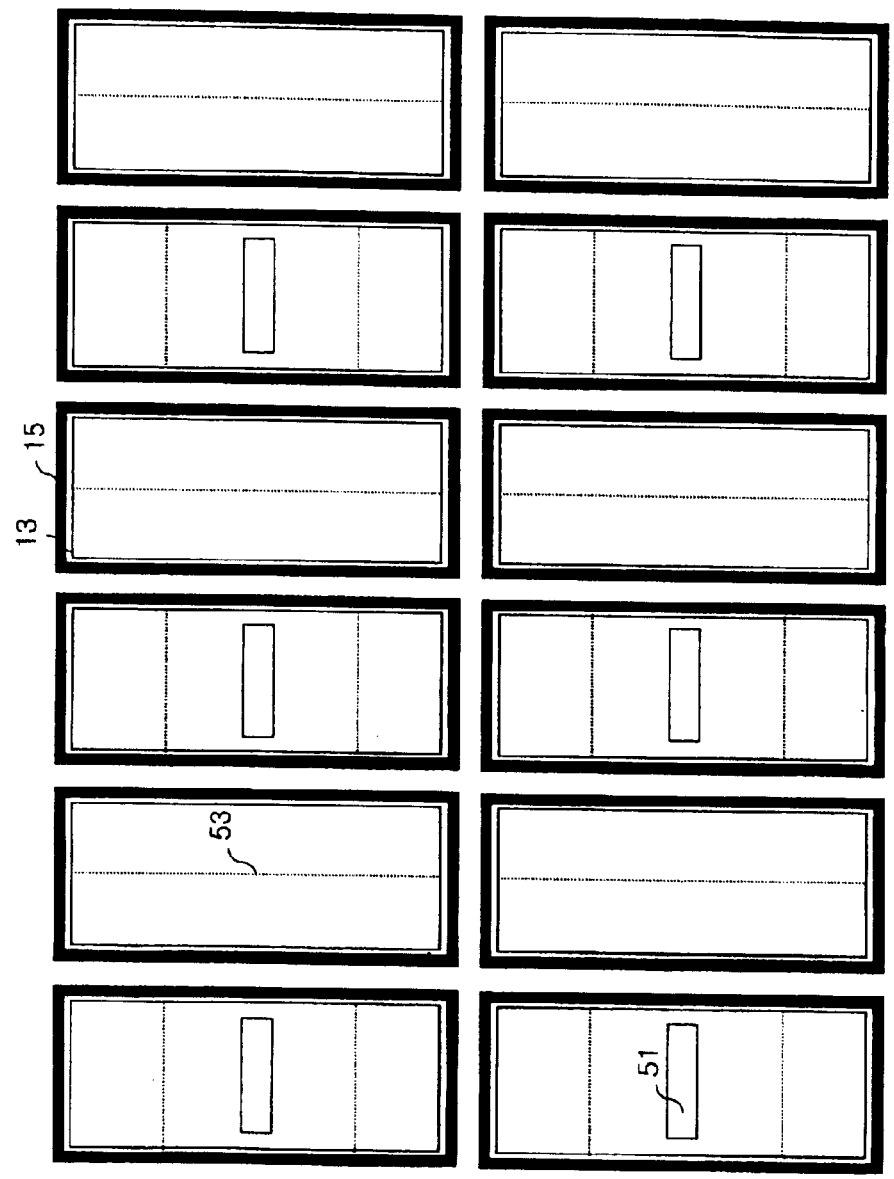
Figure 8E:
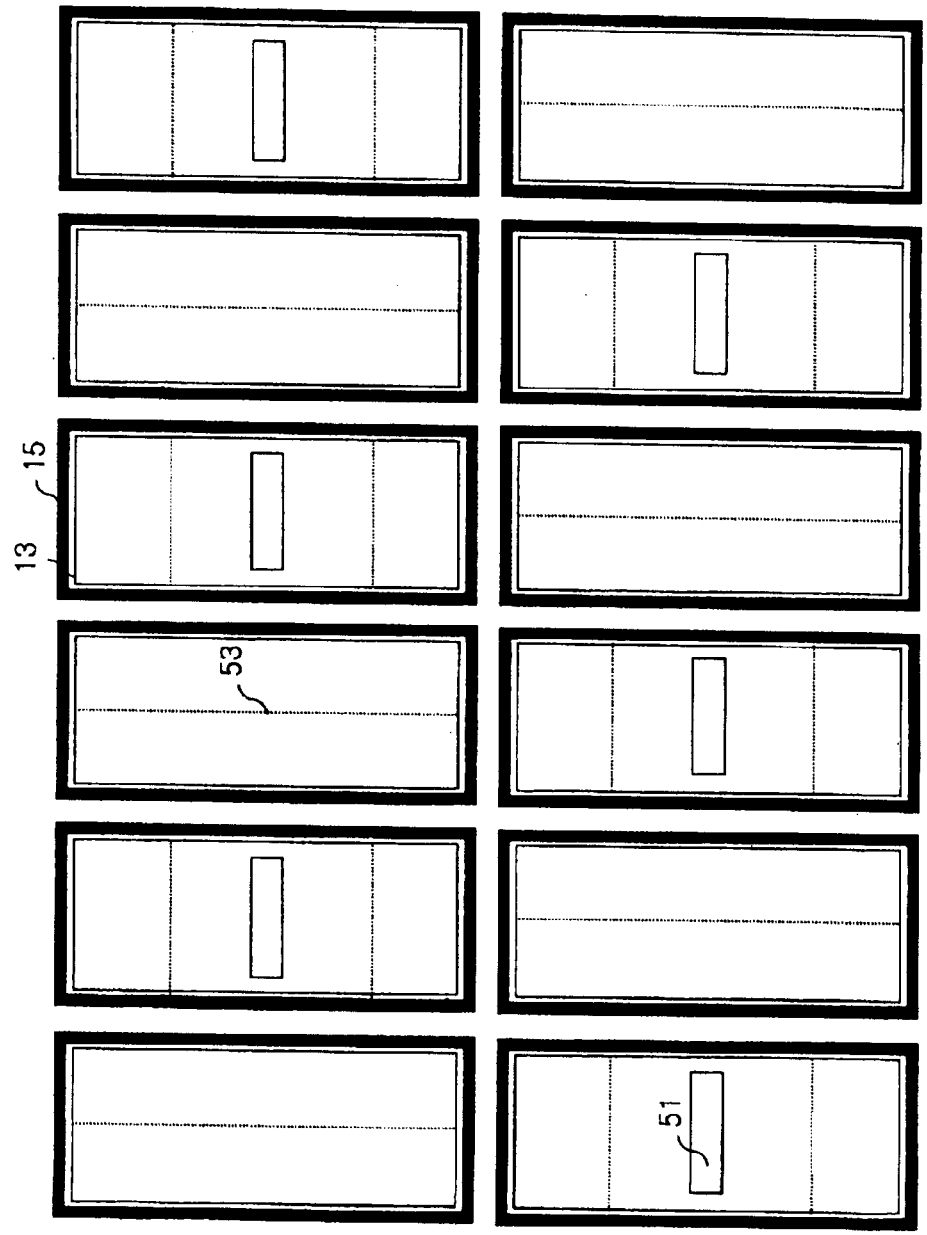
Figure 9A:
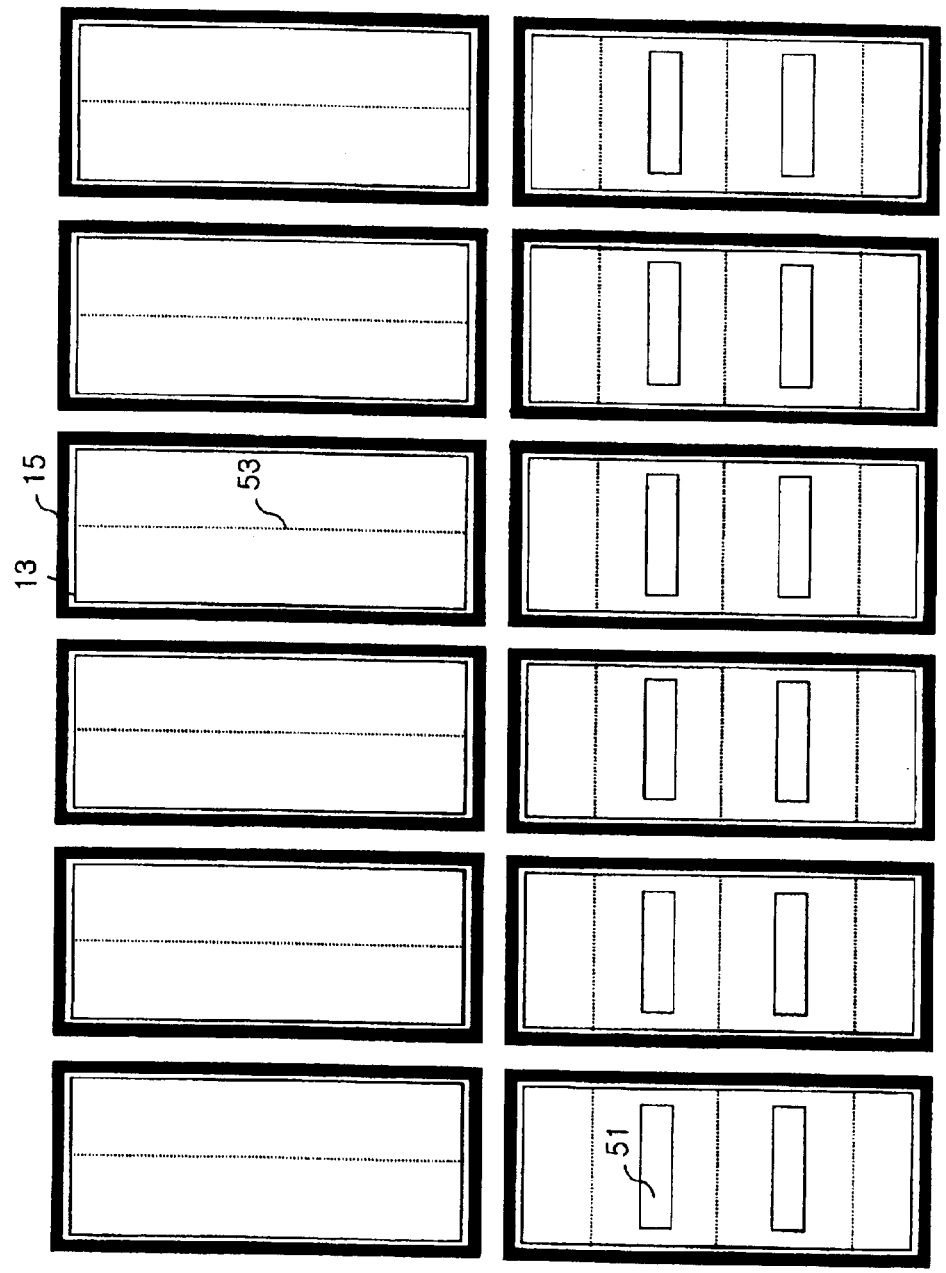
Figure 9C:
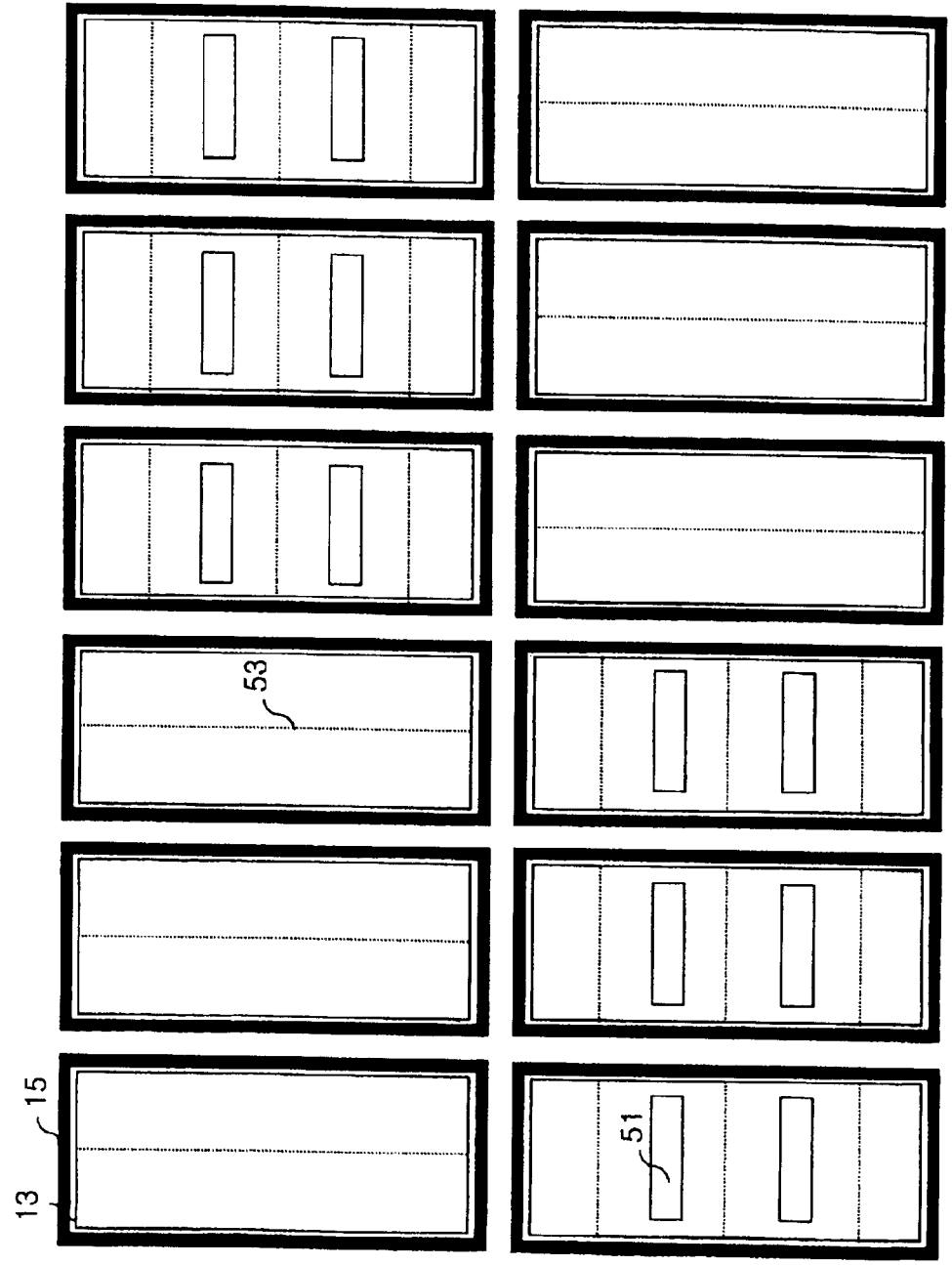
Figure 9D:
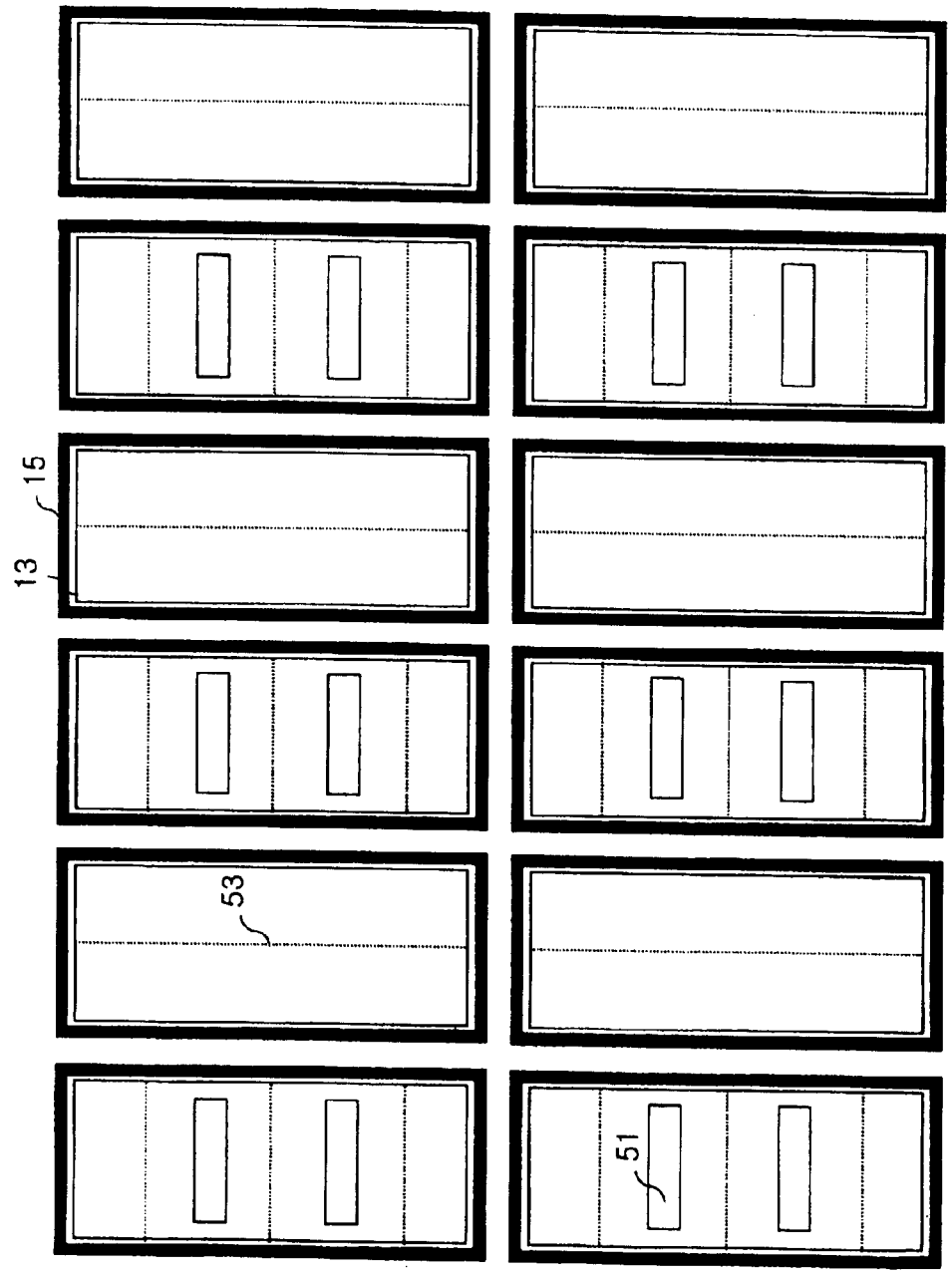
Figure 9E:
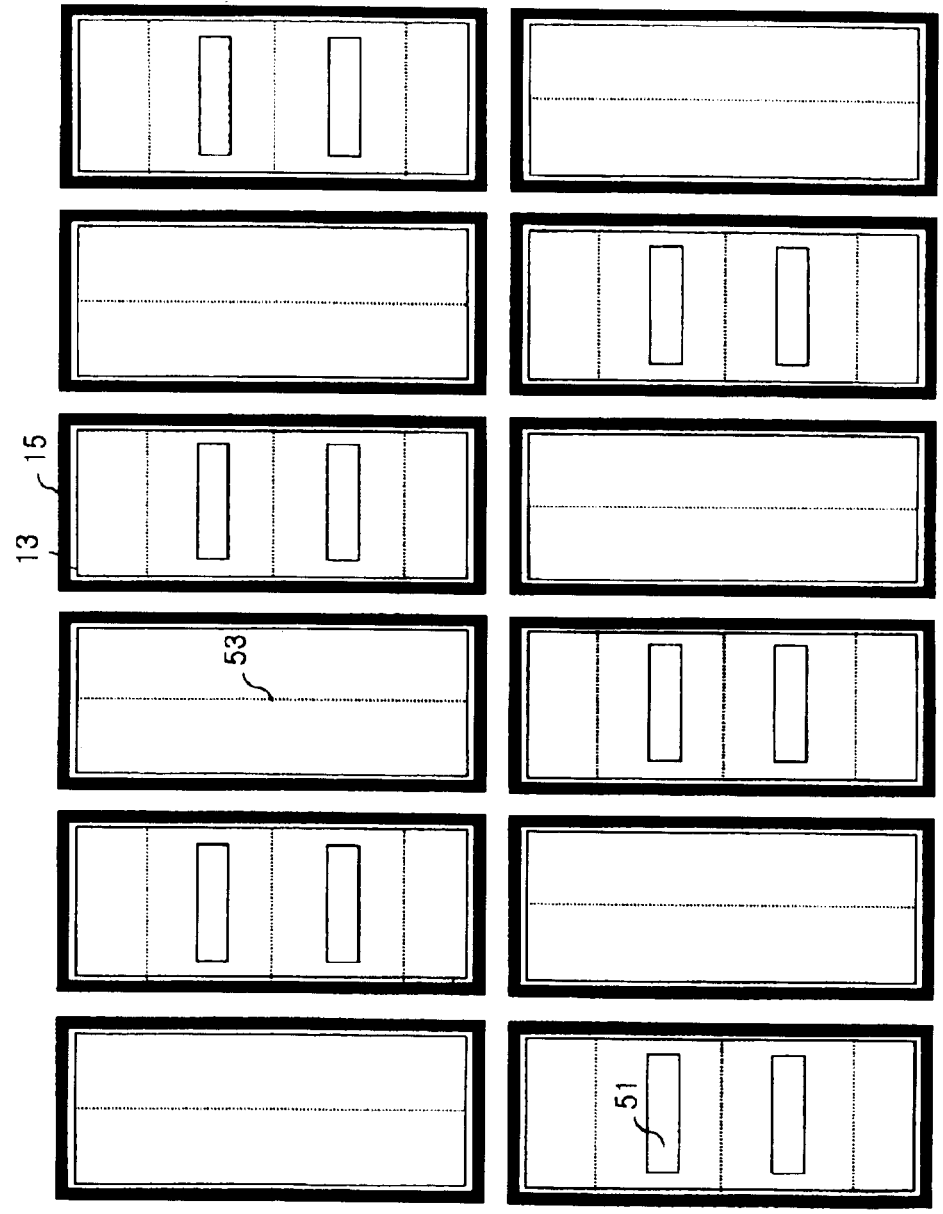
Figure 10A:
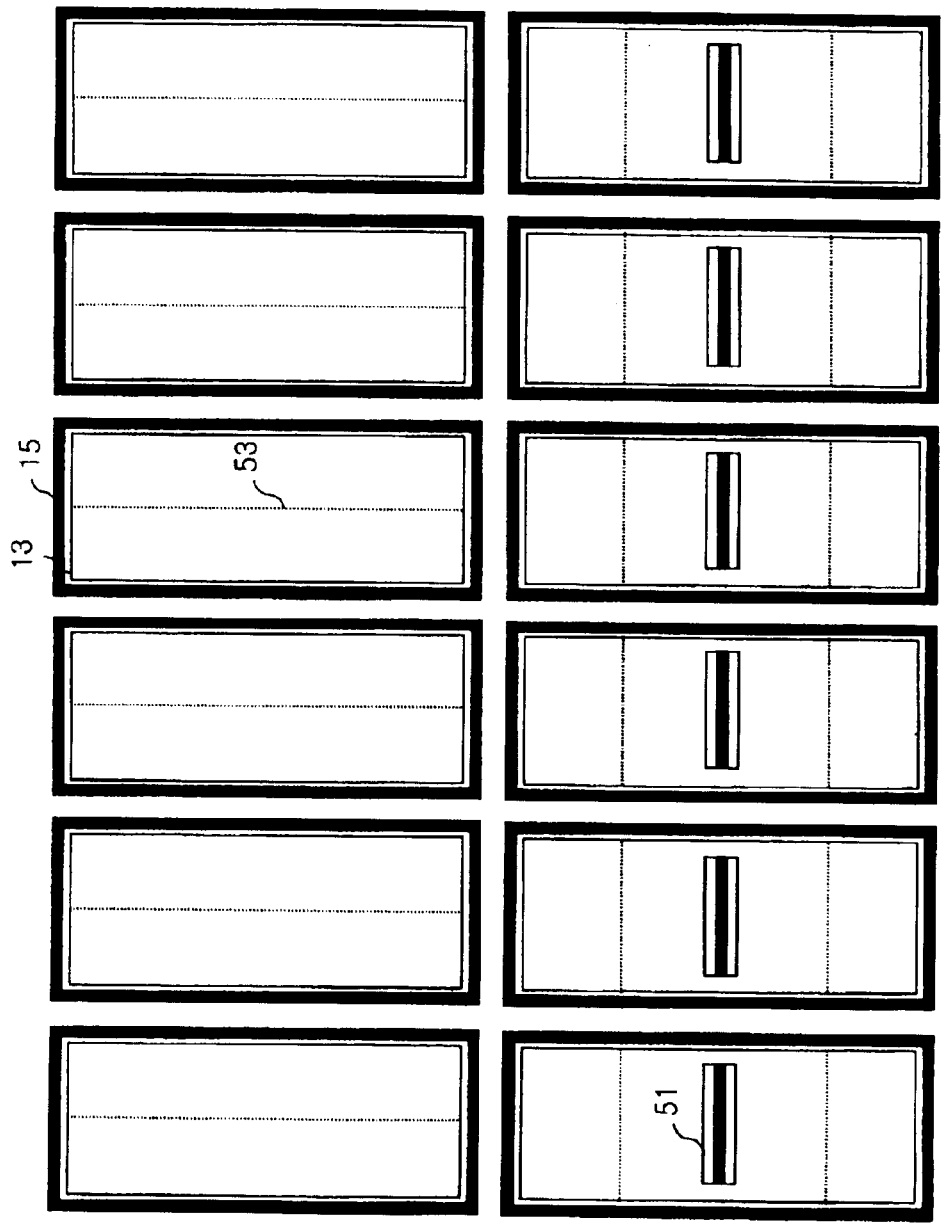
FIGS. 10a to 10e are plan views showing a multi-domain liquid crystal display device according to the ninth embodiment of the present invention.
Figure 10B:
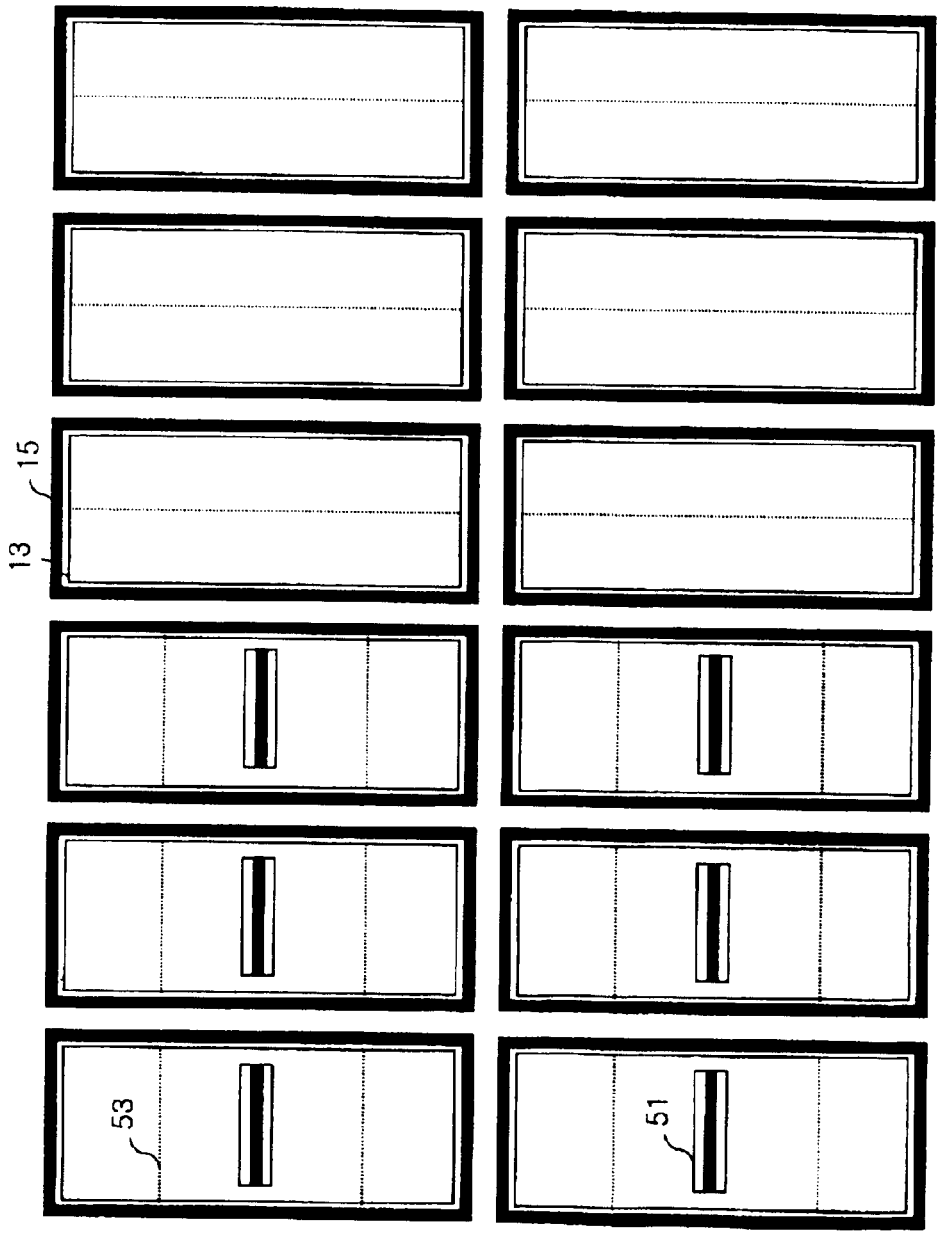
Figure 10C:
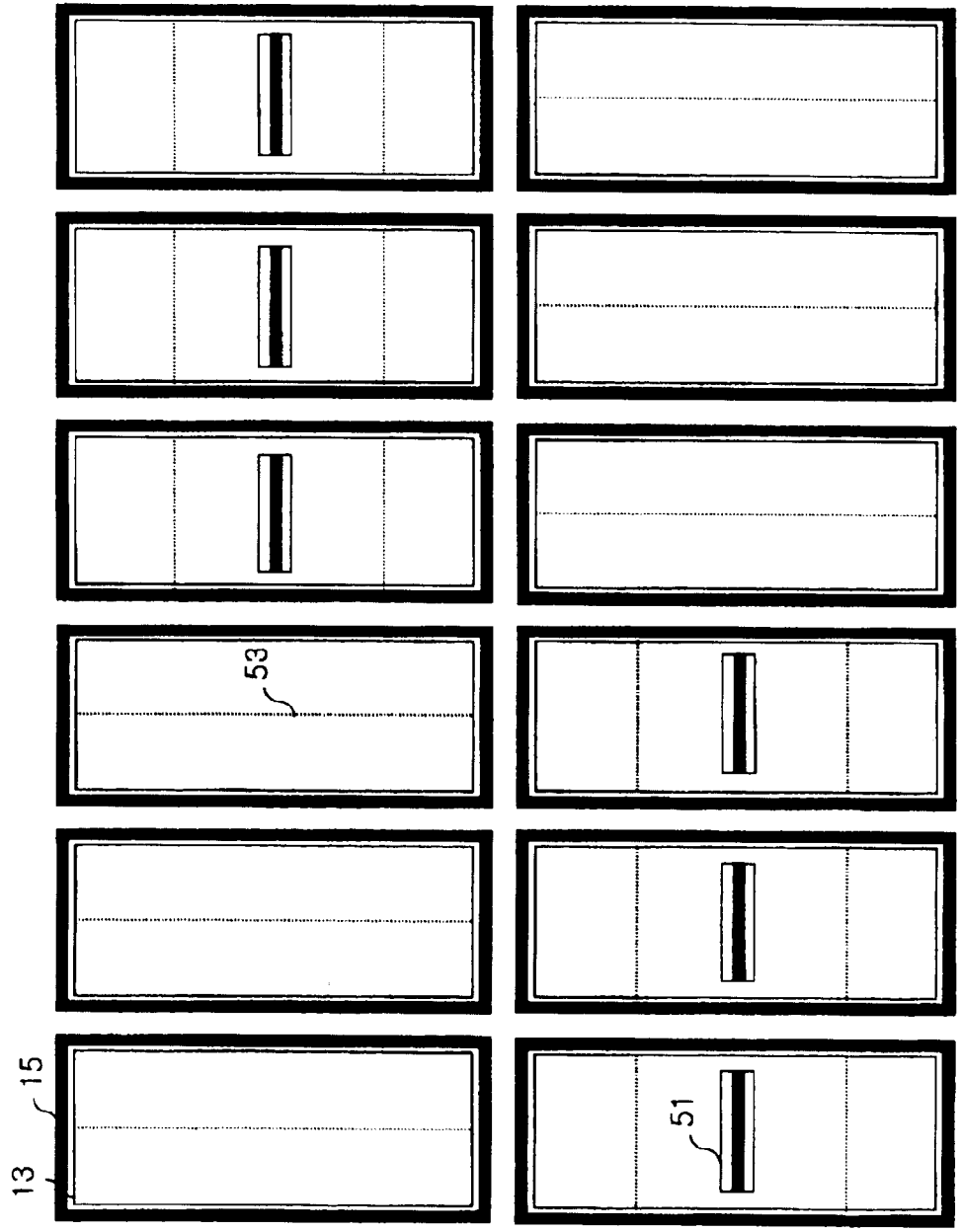
Figure 10D:
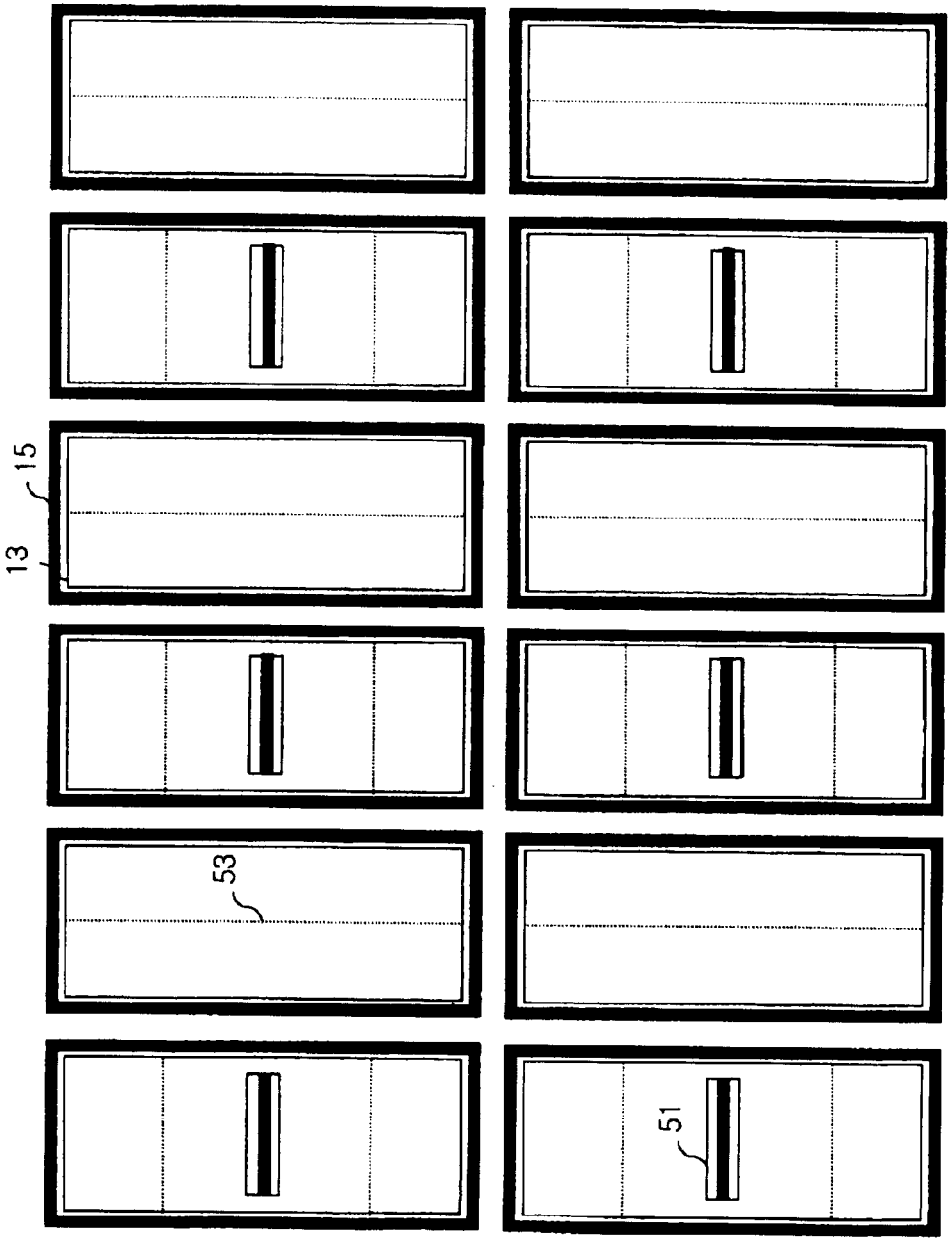
Figure 10E:
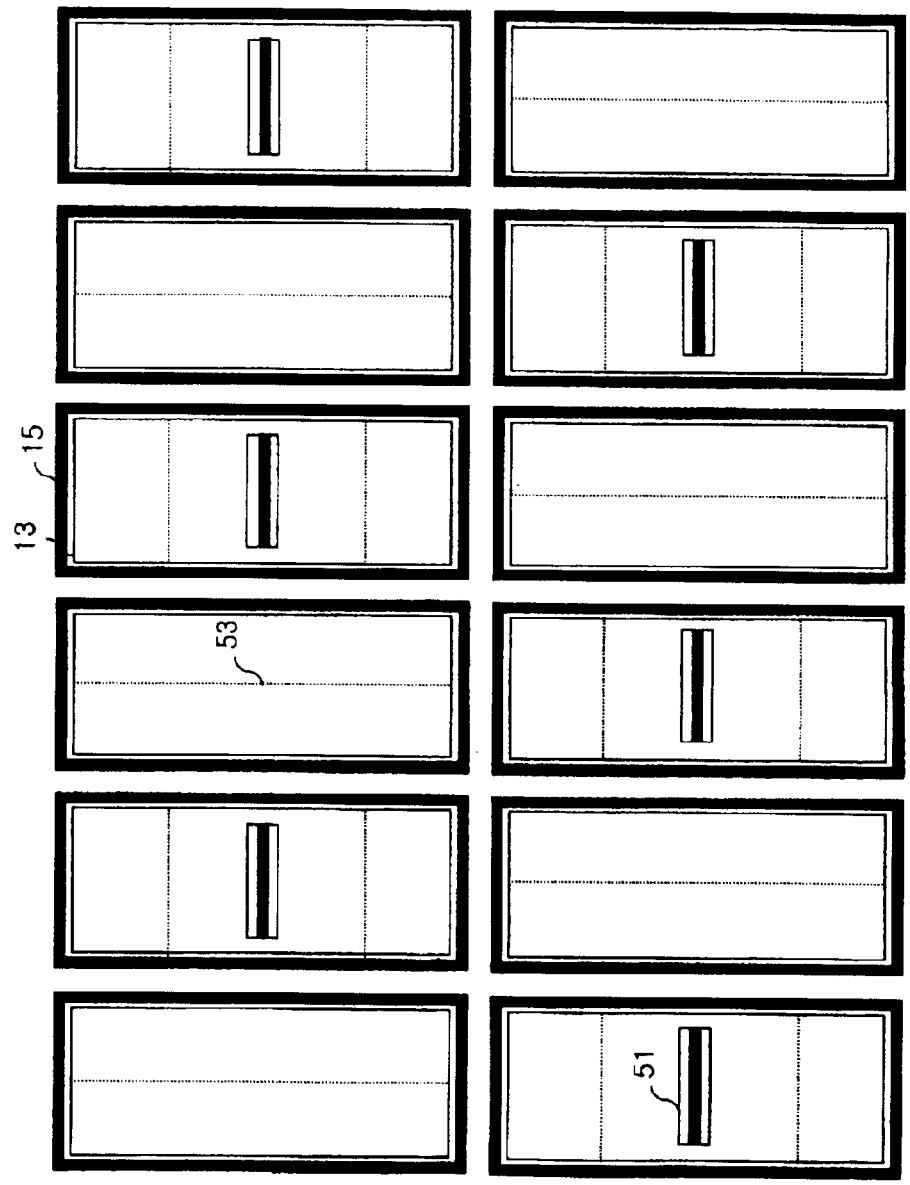
Figure 11B:
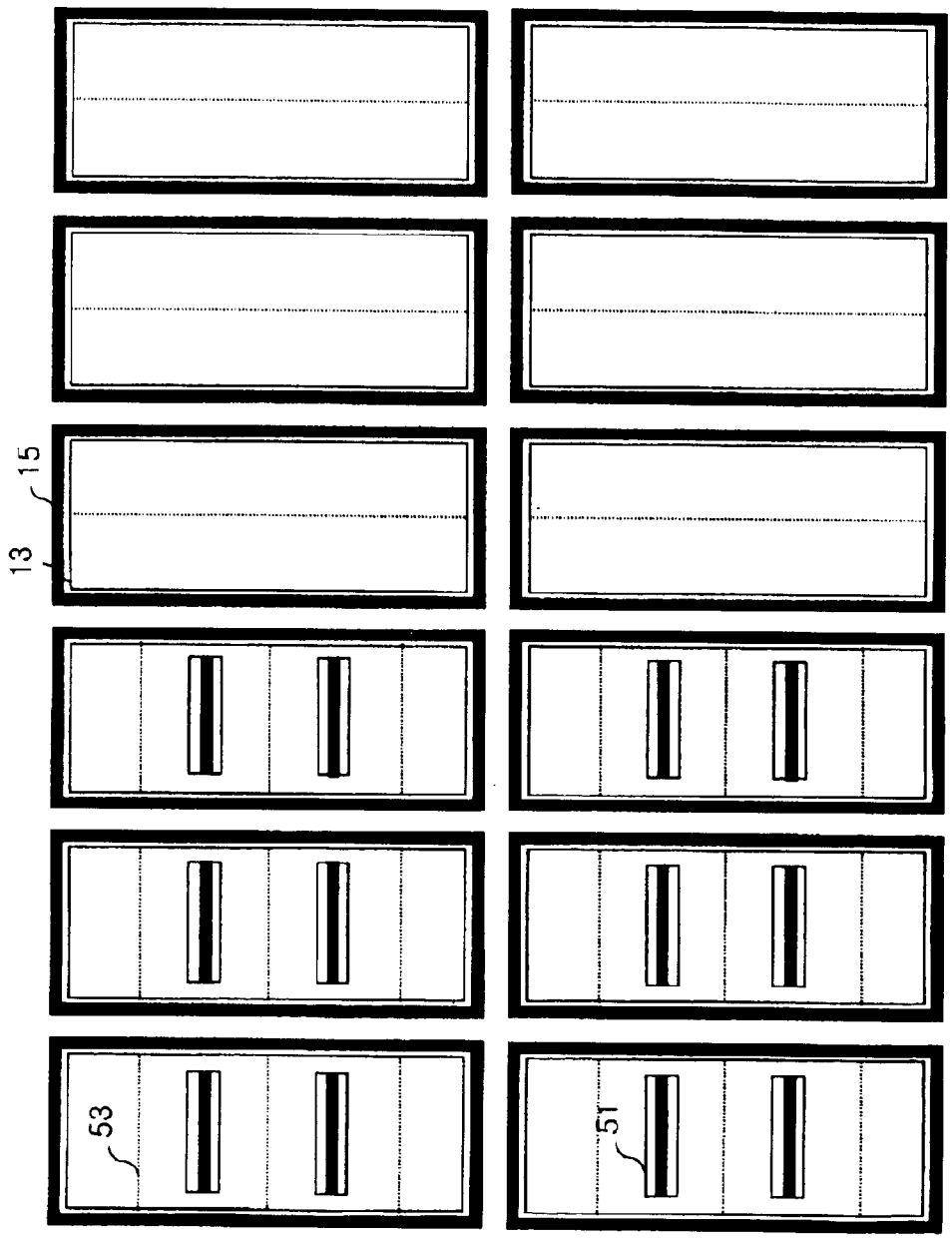
Figure 11C:
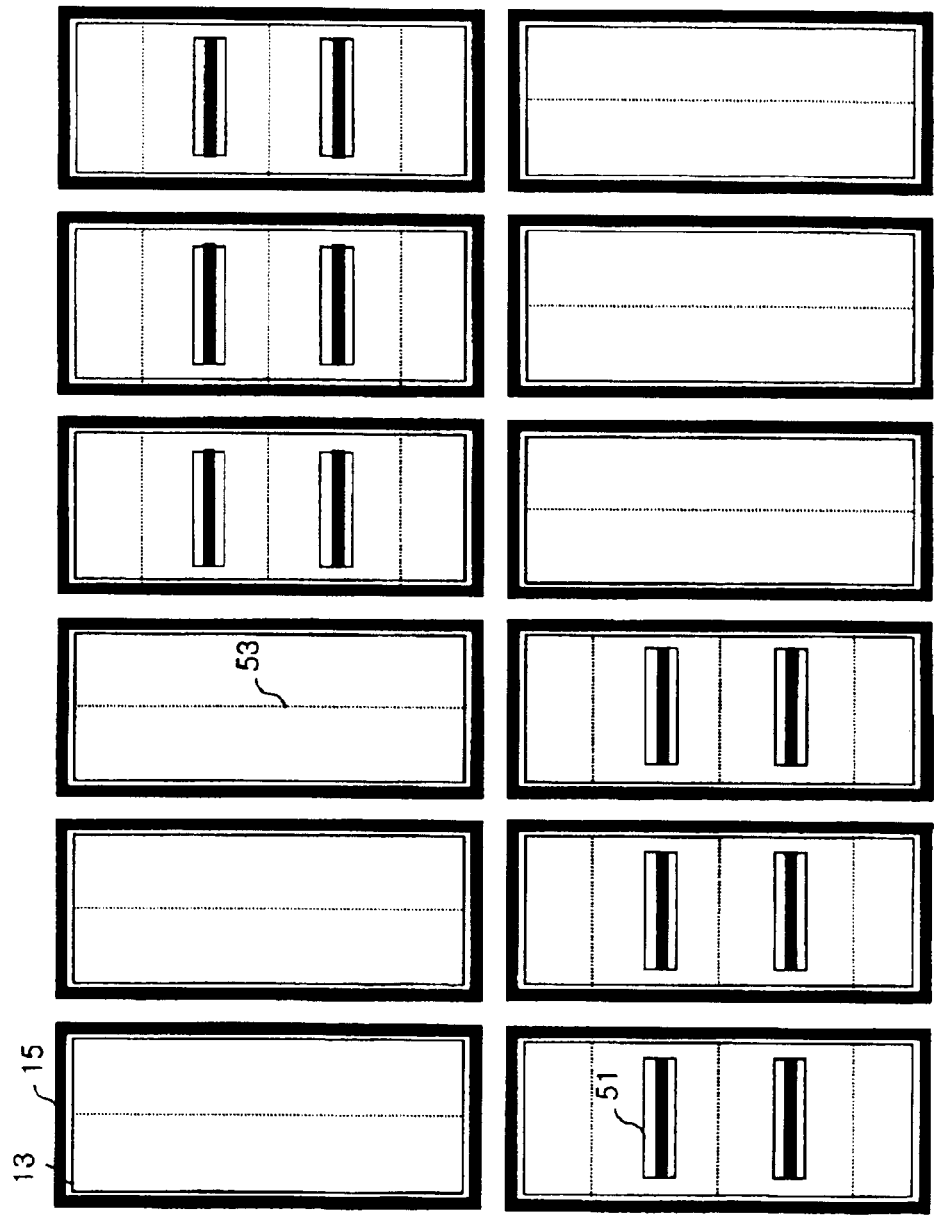
Figure 11D:
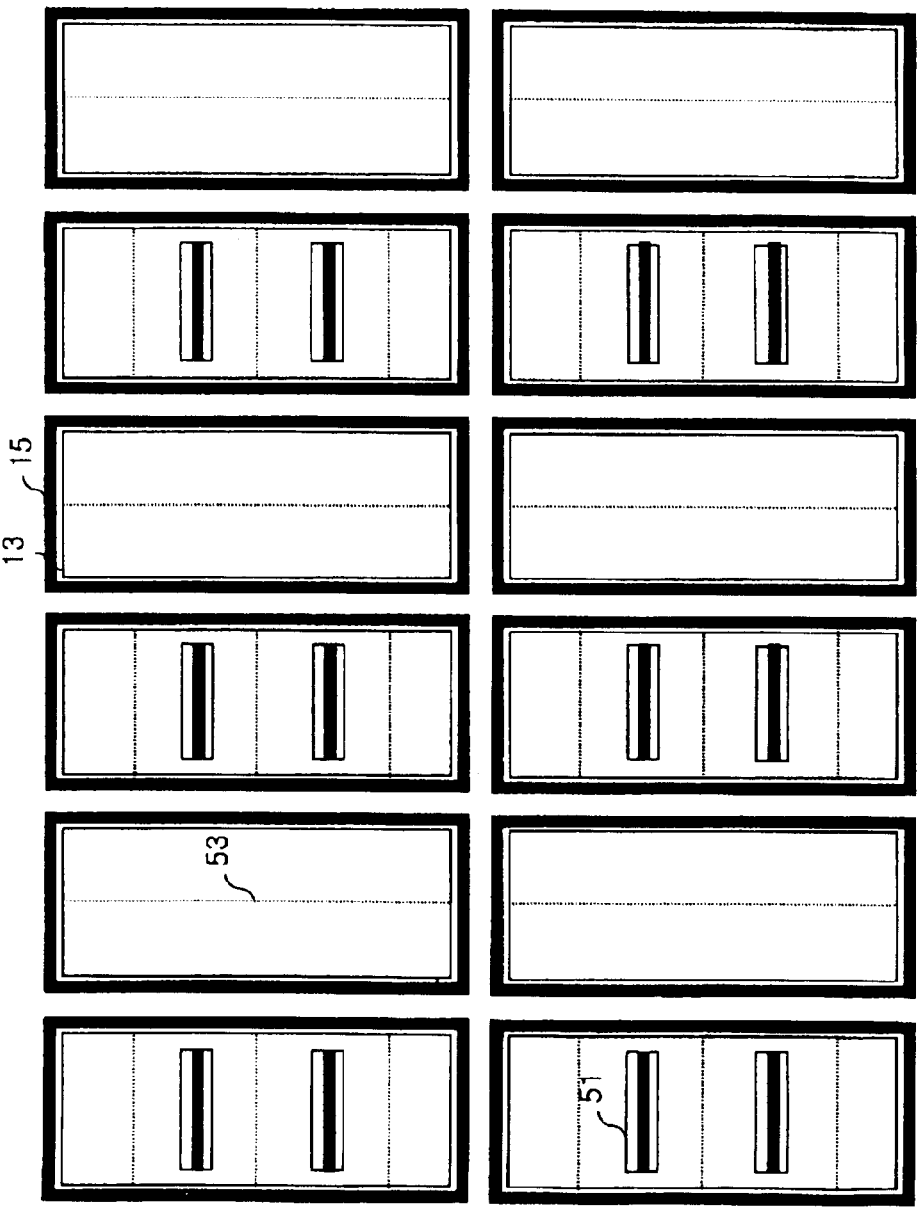
Figure 11E:
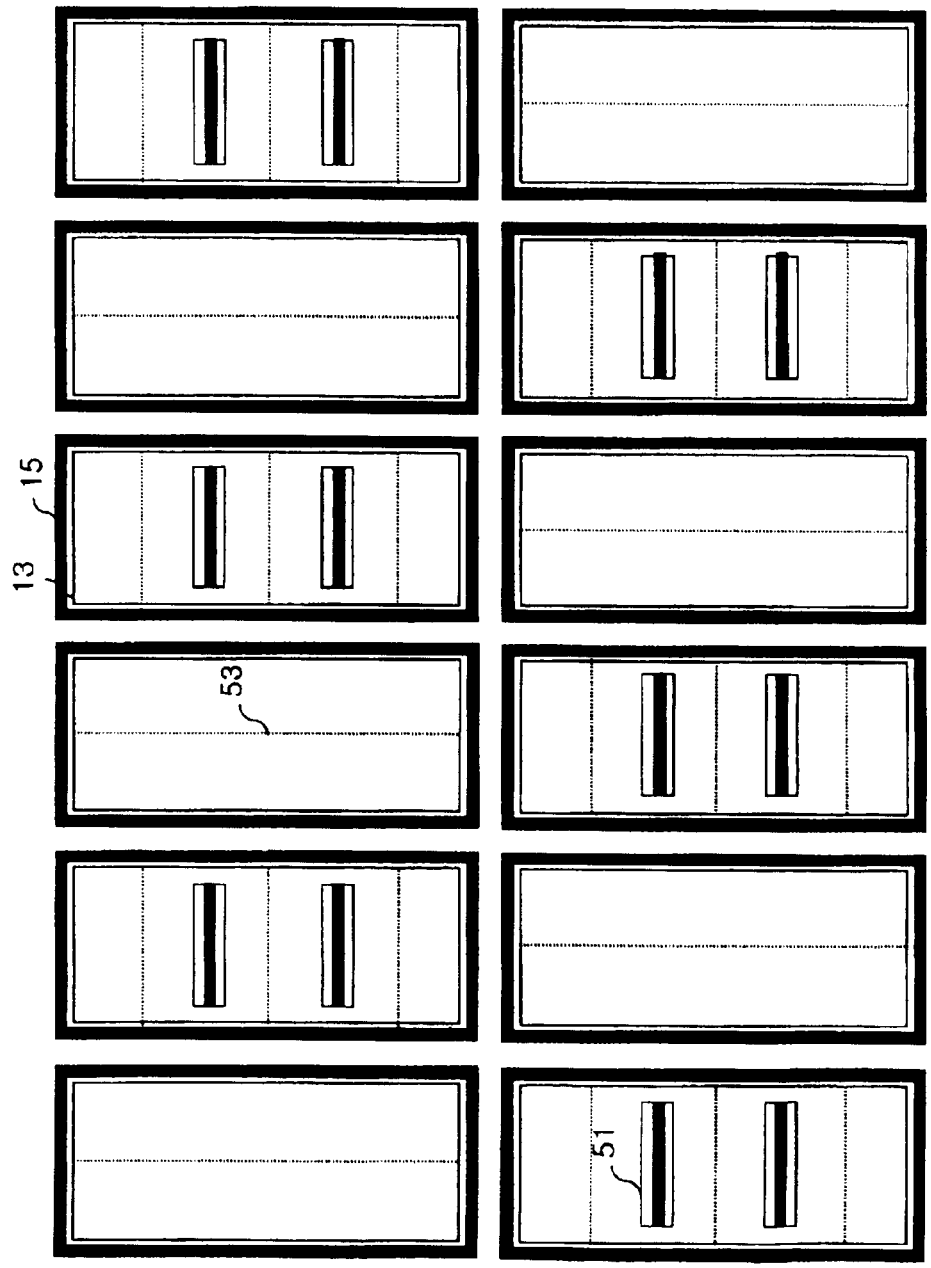

Furthermore, in FIGS. 6*b* and 6*d,* the passivation film 37 is formed of a material such as SiNx or SiOx, In FIGS. 6*c* and 6*e,* the passivation film 37 is formed of BCB, acrylic resin or polyimide.

In the multi-domain liquid crystal display device of FIGS. 6*d* and 6*e,* the pixel electrode 13 overlaps the common auxiliary electrode 15 to form a storage capacitor. The light-shielding layer 25 also overlaps the common auxiliary electrode. Accordingly, an aperture ratio is high. In the multi-domain liquid crystal display device shown in FIGS. 6*b* and 6*c,* the pixel electrode 13 does not overlap the common auxiliary electrode 15 and the light-shielding layer 25 overlaps the pixel electrode so that leakage of light is avoided.

FIGS. 7, 8, 9, 10 and 11 show plan views of a multi-domain liquid crystal display device according to the sixth to tenth embodiments of the present invention.

In the liquid crystal display device shown in FIGS. 7, 8, 9, 10 and 11, three pixels repeat alternately in one unit and the dielectric structure is simply formed in horizontal direction or vertical direction. Thus, a multi-domain is realized.

In addition to the above embodiments, the liquid crystal display device of the present invention, the dielectric structure 53 is formed on the pixel electrode, the common electrode, the color filter layer and/or an overcoat layer, The pixel electrode, the passivation film, the gate insulating film, the color filter layer, the overcoat layer and/or the common electrode are patterned so that the electric field induction window 51 such as hole or slit is formed therein. Thus, electric distortion effect and the multi-domain can be realized.

Furthermore, the electric field induction window 51 or the dielectric structure 53 is patterned long in horizontal direction, vertical direction and diagonal direction to obtain effect divided into two domains, or patterned in X shape, + shape, ◊ shape, comb shape, or double Y(YY) shape, or X shape and + shape are simultaneously patterned, to obtain effect divided into four domains and multi-domain. Alternatively, the electric field induction window 51 or the dielectric structure 53 may be formed on at least one of the first substrate and the second substrate, or independently or together on both substrates.

Additionally, in the multi-domain liquid crystal display device of the present invention, an alignment film (not shown) is formed over the first substrate and/or the second substrate. A photo alignment film of a material such as PVCN, PSCN, CelCN, or their based compound may be used as the alignment film. The other materials suitable for photo-alignment may be used as the alignment film.

Light is irradiated to the photo-alignment film at least one time to determine a pretilt angle and alignment direction or pretilt direction of the director of the liquid crystal molecule at the same time, thereby obtaining stable alignment of the liquid crystal. The light used for the photo-alignment is suitable for light in an ultraviolet ray region. Un-polarized light, linearly-polarized light or partially polarized light may be used for the photo-alignment.

The photo-alignment is applicable to one of the first substrate and the second substrate or both substrates. Different alignment methods are applicable to both substrates. Although the alignment film has been formed, alignment process may not be performed.

Furthermore, the aforementioned alignment is performed to form the multi-domain liquid crystal display device divided into at least two regions. Thus, the liquid crystal molecule of the liquid crystal layer may be aligned differently on each region. In other words, each pixel is divided into four regions in + shape or X shape, or each pixel is divided in horizontal, vertical, or diagonal direction. Alignment process or alignment direction is varied depending on each region and each substrate, so that multi-domain effect can be realized. At least one region of the divided regions may be a non-alignment region or all the divided regions may be a non-alignment region.

As aforementioned, the multi-domain liquid crystal display device has the following advantages.

The common auxiliary electrode is formed on the same layer as the gate lines to surround the pixel region and the dielectric structures are patterned in different forms within neighboring pixels on the common electrode, so that electric field distortion can be induced, thereby facilitating control of alignment direction in the domain and improving the viewing angle and the multi-domain effect. Moreover, since the common auxiliary electrode is in the same layer as the gate lines, short between the pixel electrode and the common auxiliary electrode is avoided, thereby improving yield.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A multi-domain liquid crystal display device comprising:
    a data line to apply a data signal;
    a pixel electrode for driving a liquid crystal;
    a gate line crossed to the data line, to define a pixel region;
    a common auxiliary electrode formed to surround the pixel region; and
    a plurality of electric field distortion dielectric structures formed in different, and not mirror-image, configurations within neighboring pixel regions.

2. The multi-domain liquid crystal display device as claimed in claim 1, wherein the common auxiliary electrode is formed on a layer same as the gate line.

3. A multi-domain liquid crystal display device comprising:
    a data line to apply a data signal;
    a pixel electrode for driving a liquid crystal, wherein the pixel electrode is divided into a plurality of domains, the pixel electrode having an electric field induction window therein;
    a gate line crossed to the data line, to define a pixel region;
    a common auxiliary electrode formed to surround the pixel region; and
    a plurality of electric field distortion dielectric structures in the plurality of domains, wherein the dielectric structures in neighboring pixel regions have different, and not mirror-image, configurations.

4. A multi-domain liquid crystal display device comprising:
    first and second substrates opposing each other between a liquid crystal layer;
    a plurality of gate lines and data lines on the first substrate lengthwise and crosswise, to define at least two pixel regions;
    a common auxiliary electrode on a layer equal to the gate lines to surround each of the pixel regions;

a gate insulating film on the first substrate;

a passivation film on the gate insulating film including the first substrate;

a pixel electrode in each of the pixel regions, wherein at least one of the pixel regions is divided into a plurality of domains;

a light-shielding layer on the second substrate;

a color filter layer on the light-shielding layer;

a common electrode on the color filter layer;

at least one electric field distortion dielectric structure in each of the at least two pixel regions, wherein the dielectric structures in neighboring pixel regions have different, and not mirror-image, configurations; and an alignment film on at least one of the first and second substrates.

5. The multi-domain liquid crystal display device as claimed in claim 4, wherein the pixel electrode overlaps the common auxiliary electrode.

6. The multi-domain liquid crystal display device as claimed in claim 5, where the light-shielding layers overlaps the common auxiliary electrode.

7. The multi-domain liquid crystal display device as claimed in claim 4, wherein the common auxiliary electrode is electrically connected with the common electrode.

8. The multi-domain liquid crystal display device as claimed in claim 4, further comprising a thin film transistor formed in a crossing point of the gate lines and the data lines.

9. The multi-domain liquid crystal display device as claimed in claim 4, wherein the electric field dielectric structures are formed on the pixel electrode.

10. The multi-domain liquid crystal display device as claimed in claim 4, wherein the electric field dielectric structures are formed on the common electrode.

11. The multi-domain liquid crystal display device as claimed in claim 4, wherein the electric field dielectric structures are formed on the color filter layer.

12. The multi-domain liquid crystal display device as claimed in claim 4, wherein the passivation film comprises a material selected from one group consisting of BCB, acrylic resin and polyimide.

13. The multi-domain liquid crystal display device as claimed in claim 4, wherein the passivation film comprises a material selected from one group consisting of $SiN_x$, and $SiO_x$.

14. The multi-domain liquid crystal display device as claimed in claim 4, wherein the common auxiliary electrode comprises a material selected from one group consisting of ITO, Al, Mo, Cr, Ta, Ti and Al alloy.

15. The multi-domain liquid crystal display device as claimed in claim 4, wherein the pixel electrode comprises a material selected from one group consisting of ITO, Al and Cr.

16. The multi-domain liquid crystal display device as claimed in claim 4, wherein the common electrode comprises ITO.

17. The multi-domain liquid crystal display device as claimed in claim 4, wherein the dielectric structure has a dielectric constant smaller than that of the liquid crystal layer.

18. The multi-domain liquid crystal display device as claimed in claim 4, wherein the dielectric structure comprises a photosensitive material.

19. The multi-domain liquid crystal display device as claimed in claim 4, wherein the dielectric structure comprises a material selected from one group consisting of photoacrylate and BCB.

20. The multi-domain liquid crystal display device as claimed in claim 4, wherein the pixel region is divided into at least two regions so that the liquid crystal molecules of the liquid crystal layer have different driving characteristics on each region.

21. The multi-domain liquid crystal display device as claimed in claim 4, wherein the alignment film is divided into at least two regions so that liquid crystal molecules of the liquid crystal layer have different alignment characteristics on each region.

22. The multi-domain liquid crystal display device as claimed in claim 21, wherein at least one region of the alignment film is aligned.

23. The multi-domain liquid crystal display device as claimed in claim 21, wherein at least one of the two regions of the alignment film is not aligned.

24. The multi-domain liquid crystal display device as claimed in claim 4, wherein the liquid crystal constituting the liquid crystal layer has a positive dielectric anisotropy or a negative dielectric anisotropy.

25. The multi-domain liquid crystal display device as claimed in claim 4, comprising a negative uniaxial film on at least one of the first substrate and the second substrate.

26. The multi-domain liquid crystal display device as claimed in claim 4, further comprising a negative biaxial film on at least one of the first substrate and the second substrate.

27. The multi-domain liquid crystal display device as claimed in claim 4, wherein the liquid crystal layer includes a chiral dopant.

28. A multi-domain liquid crystal display device comprising:

first and second substrates opposing each other between a liquid crystal layer;

a plurality of gate lines and data lines on the first substrate lengthwise and crosswise, to define at least two pixel regions;

a common auxiliary electrode on a layer equal to the gate lines to surround each of the pixel regions;

a gate insulating film on the first substrate;

a passivation film on the gate insulating film including the first substrate;

a pixel electrode in each of the pixel regions, wherein at least one of the pixel regions is divided into a plurality of domains; the pixel electrode not overlapping the common auxiliary electrode;

a light-shielding layer on the second substrate;

a color filter layer on the light-shielding layer;

a common electrode on the color filter layer;

a at least one electric field distortion dielectric structure in each of the at least two pixel regions, wherein the dielectric structures in neighboring pixel regions have different, and not mirror-image, configurations; and an alignment film on at least one of the first and second substrates.

29. The multi-domain liquid crystal display device as claimed in claim 28, wherein the light-shielding layer overlaps the pixel electrode.

30. The multi-domain liquid crystal display device as claimed in claim 28, wherein the gate insulating film and the passivation film are formed in a region except the common auxiliary electrode.

31. A multi-domain liquid crystal display device comprising:

first and second substrates opposing each other between a liquid crystal layer;

a plurality of gate lines and data lines on the first substrate lengthwise and crosswise, to define at least two pixel regions;

a common auxiliary electrode on a layer equal to the gate lines to surround each of the pixel regions;

a gate insulating film on the first substrate;

a passivation film on the gate insulating film including the first substrate;

a pixel electrode in each of the pixel regions, wherein at least one of the pixel regions is divided into a plurality of domains, the pixel electrode having an electric field induction window therein;

a light-shielding layer on the second substrate;

a color filter layer on the light-shielding layer;

a common electrode on the color filter layer;

at least one electric field distortion dielectric structure in each of the at least two pixel regions, wherein the dielectric structures in neighboring pixel regions have different, and not mirror-image, configurations; and an alignment film on at least one of the first and second substrates.

32. A multi-domain liquid crystal display device comprising:

first and second substrates opposing each other between a liquid crystal layer;

a plurality of gate lines and data lines on the first substrate lengthwise and crosswise, to define at least two pixel regions;

a common auxiliary electrode on a layer equal to the gate lines to surround each of the pixel regions;

a gate insulating film on the first substrate;

a passivation film on the gate insulating film including the first substrate, the passivation film having an electric field induction window therein;

a pixel electrode in each of the pixel regions, wherein at least one of the pixel regions is divided into a plurality of domains;

a light-shielding layer on the second substrate;

a color filter layer on the light-shielding layer;

a common electrode on the color filter layer;

at least one electric field distortion dielectric structure in each of the at least two pixel regions, wherein the dielectric structures in neighboring pixel regions have different, and not mirror-image, configurations; and an alignment film on at least one of the first and second substrates.

33. A multi-domain liquid crystal display device comprising:

first and second substrates opposing each other between a liquid crystal layer;

a plurality of gate lines and data lines on the first substrate lengthwise and crosswise, to define at least two pixel regions;

a common auxiliary electrode on a layer equal to the gate lines to surround each of the pixel regions;

a gate insulating film on the first substrate, the gate insulating film having an electric field induction window therein;

a passivation film on the gate insulating film including the first substrate;

a pixel electrode in each of the pixel regions, wherein at least one of the pixel regions is divided into a plurality of domains;

a light-shielding layer on the second substrate;

a color filter layer on the light-shielding layer;

a common electrode on the color filter layer;

at least one electric field distortion dielectric structure in each of the at least two pixel regions, wherein the dielectric structures in neighboring pixel regions have different, and not mirror-image, configurations; and an alignment film on at least one of the first and second substrates.

34. A multi-domain liquid crystal display device comprising:

first and second substrates opposing each other between a liquid crystal layer;

a plurality of gate lines and data lines on the first substrate lengthwise and crosswise, to define at least two pixel region;

a common auxiliary electrode on a layer equal to the gate lines to surround each of the pixel regions;

a gate insulating film on the first substrate;

a passivation film on the gate insulating film including the first substrate;

a pixel electrode in each of the pixel regions, wherein at least one of the pixel regions is divided into a plurality of domains;

a light-shielding layer on the second substrate;

a color filter layer on the light-shielding layer;

a common electrode on the color filter layer, the common electrode having an electric field induction window therein;

at least one electric field distortion dielectric structure in each of the at least two pixel regions, wherein the dielectric structures in neighboring pixel regions have different, and not mirror-image, configurations; and an alignment film on at least one of the first and second substrates.

35. A multi-domain liquid crystal display device comprising:

first and second substrates opposing each other between a liquid crystal layer;

a plurality of gate lines and data lines on the first substrate lengthwise and crosswise, to define at least two pixel regions;

a common auxiliary electrode on a layer equal to the gate lines to surround each of the pixel regions;

a gate insulating film on the first substrate;

a passivation film on the gate insulating film including the first substrate;

a pixel electrode in each of the pixel regions, wherein at least one of the pixel regions is divided into a plurality of domains;

a light-shielding layer on the second substrate;

a color filter layer on the light-shielding layer, the color filter layer having an electric field induction window therein;

a common electrode on the color filter layer;

at least one electric field distortion dielectric structure in each of the at least two pixel regions, wherein the dielectric structures in neighboring pixel regions have different, and not mirror-image, configurations; and an alignment film on at least one of the first and second substrates.

36. A multi-domain liquid crystal display device comprising:

first and second substrates opposing each other between a liquid crystal layer;

a plurality of gate lines and data lines on the first substrate lengthwise and crosswise, to define at least two pixel regions;

a common auxiliary electrode on a layer equal to the gate lines to surround each of the pixel regions;

a gate insulating film on the first substrate;

a passivation film on the gate insulating film including the first substrate;

a pixel electrode in each of the pixel regions, wherein at least one of the pixel regions is divided into a plurality of domains;

a light-shielding layer on the second substrate;

a color filter layer on the light-shielding layer;

an over coat layer on the color filter layer, the over coat layer having an electric field induction window therein;

a common electrode on the over coat layer;

at least one electric field distortion dielectric structure in each of the at least two pixel regions, wherein the dielectric structures in neighboring pixel regions have different, and not mirror-image, configurations; and an alignment film on at least one of the first and second substrates.

* * * * *